(12) United States Patent
Schatzberger et al.

(10) Patent No.: US 12,734,482 B2
(45) Date of Patent: Sep. 15, 2026

(54) SEPARATION OF ALCOHOL USING A MEMBRANE

(71) Applicant: ALTR FLTR INC., Scottsdale, AZ (US)

(72) Inventors: Richard Schatzberger, Cave Creek, AZ (US); Lyderic Bocquet, Paris (FR); Alessandro Siria, Paris (FR); Kathryn Maurine Orr, Phoenix, AZ (US); Javier Perez Carvajal, Saragossa (ES)

(73) Assignee: ALTR FLTR INC., Scottsdale, AZ (US)

( * ) Notice: Subject to any disclaimer, the term of this patent is extended or adjusted under 35 U.S.C. 154(b) by 464 days.

(21) Appl. No.: 18/020,230

(22) PCT Filed: Aug. 6, 2021

(86) PCT No.: PCT/US2021/045020
§ 371 (c)(1),
(2) Date: Feb. 7, 2023

(87) PCT Pub. No.: WO2022/035705
PCT Pub. Date: Feb. 17, 2022

(65) Prior Publication Data
US 2023/0302408 A1 Sep. 28, 2023

Related U.S. Application Data

(60) Provisional application No. 63/063,861, filed on Aug. 10, 2020.

(51) Int. Cl.
*B01D 61/00* (2006.01)
*B01D 65/08* (2006.01)
(Continued)

(52) U.S. Cl.
CPC ....... *B01D 61/0024* (2022.08); *B01D 61/005* (2013.01); *B01D 65/08* (2013.01);
(Continued)

(58) Field of Classification Search
None
See application file for complete search history.

(56) References Cited

U.S. PATENT DOCUMENTS 4,778,688 A 10/1988 Matson
5,013,447 A 5/1991 Lee et al.
(Continued)

FOREIGN PATENT DOCUMENTS

CN 103768946 A 5/2014
CN 110591875 A 12/2019
(Continued)

OTHER PUBLICATIONS

Ambrosi et al., Transport of Components in the Separation of Ethanol from Aqueous Dilute Solutions by Forward Osmosis, Ind. Eng. Chem. Res. 2018, 57, 2967-2975 (Year: 2018).*
(Continued)

*Primary Examiner* — Krishnan S Menon
(74) *Attorney, Agent, or Firm* — Resolute Legal PLLC

(57) ABSTRACT

Various systems and processes are directed to filtering organic compounds using nanoporous membranes and osmosis. In various implementations, the nanoporous membrane can be trained on one or more organic compounds such that the nanoporous membrane preferentially allows the one or more organic compounds to permeate the nanoporous membrane to the exclusion of other compounds. In some implementations, the nanoporous membrane is trained on ethanol such that the nanoporous membrane preferentially allows ethanol to permeate the nanoporous membrane to the exclusion of other compounds, such as water or other
(Continued)

compounds or mixtures. In some implementations, the selective ethanol permeation of the nanoporous membrane may occur even where the other compounds have smaller molecules than ethanol.

14 Claims, 10 Drawing Sheets

(51) Int. Cl.
*B01D 67/00* (2006.01)
*B01D 71/02* (2006.01)
*C12H 3/04* (2019.01)

(52) U.S. Cl.
CPC ...... *B01D 67/0088* (2013.01); *B01D 71/0211* (2022.08); *C12H 3/04* (2019.02); *B01D 2311/02* (2013.01); *B01D 2311/14* (2013.01); *B01D 2311/165* (2013.01); *B01D 2311/22* (2013.01); *B01D 2315/10* (2013.01); *B01D 2315/24* (2022.08); *B01D 2321/281* (2022.08)

(56) References Cited

U.S. PATENT DOCUMENTS

| | | | |
|---|---|---|---|
| 6,117,328 | A | 9/2000 | Sikdar et al. |
| 6,235,088 | B1 | 5/2001 | Matsuura |
| 7,834,225 | B1 | 11/2010 | Adiga et al. |
| 7,955,506 | B2 | 6/2011 | Bryan et al. |
| 10,384,168 | B2 | 8/2019 | Mundrigi et al. |
| 11,517,876 | B1 | 12/2022 | Nazal et al. |
| 2009/0236285 | A1 | 9/2009 | Fan et al. |
| 2012/0061319 | A1 | 3/2012 | Vandezande et al. |
| 2014/0374341 | A1 | 12/2014 | Wada et al. |
| 2015/0053607 | A1 | 2/2015 | Liu et al. |
| 2016/0326473 | A1 | 11/2016 | Thrunheer |
| 2017/0173560 | A1 | 6/2017 | Dichtel et al. |
| 2017/0312698 | A1 | 11/2017 | Belfort et al. |
| 2021/0008504 | A1* | 1/2021 | Bocquet .................. C07B 63/00 |
| 2021/0031151 | A1 | 2/2021 | Lee et al. |
| 2022/0356425 | A1 | 11/2022 | Giidenzopf |
| 2022/0369671 | A1 | 11/2022 | Chen et al. |
| 2023/0049743 | A1 | 2/2023 | Yonezawa |
| 2023/0081190 | A1 | 3/2023 | Brouwer et al. |

FOREIGN PATENT DOCUMENTS

| | | | |
|---|---|---|---|
| CN | 114181791 | A | 3/2022 |
| CN | 115044446 | A | 9/2022 |
| CN | 118995358 | A | 11/2024 |
| DE | 2339206 | A1 | 3/1975 |
| EP | 0242384 | A4 | 2/1988 |
| EP | 3584304 | A1 | 12/2019 |
| EP | 3889245 | A1 | 10/2021 |
| JP | 6104000 | B2 | 3/2017 |
| KR | 101153482 | B1 | 6/2012 |
| KR | 101986825 | B1 | 6/2019 |
| WO | 2012084075 | A1 | 6/2012 |
| WO | 2013177600 | A1 | 11/2013 |
| WO | 2016130607 | A1 | 8/2016 |
| WO | 2018119460 | A1 | 6/2018 |
| WO | 2019143225 | A1 | 7/2019 |
| WO | 2023037080 | A1 | 3/2023 |
| WO | 2025024505 | A1 | 1/2025 |

OTHER PUBLICATIONS

PCT International Search Report and Written Opinion dated Dec. 2, 2021, PCT International Application No. PCT/US2021/045020, pp. 1-9.

Gravelle, Simon, et al. "Carbon membranes for efficient water-ethanol separation." The Journal of chemical physics 145.12 (2016).

Extended European Search Report dated Jul. 22, 2024, European Application No. 21856479.7, pp. 1-12.

Nur Muna Mazlan et al., "Organic fouling behaviour of structurally and chemically different forward osmosis membranes—a study of cellulose triacetate and thin film composite membranes." Journal of Membrane Science 520 (2016): 247-261.

Xiwang Zhang et al., "A novel ethanol dehydration process by forward osmosis." Chemical engineering journal 232 (2013): 397-404 (Copy of Abstract and Introduction Provided).

Examination Report No. 1 dated May 7, 2026, Australian Application No. 2021325852, pp. 1-3.

PCT International Search Report and Written Opinion dated Jun. 7, 2024, PCT International Application No. PCT/US24/13001, pp. 1-15.

PCT International Search Report and Written Opinion dated Jun. 17, 2024, PCT International Application No. PCT/US24/15022, pp. 1-12.

* cited by examiner

SEPARATION OF ALCOHOL USING A MEMBRANE

CROSS REFERENCE TO RELATED APPLICATIONS

This application is a National Stage Application of International Application No. PCT/US21/45020 filed on Aug. 6, 2021, which claims priority to U.S. Provisional Application No. 63/063,861, filed on Aug. 10, 2020, the contents of both which are hereby incorporated by reference.

FIELD

The present disclosure relates to nanoporous membranes and removal of an organic compound.

BACKGROUND

There is a growing interest around the world for low alcohol and non-alcoholic adult beverages. While low alcohol and non-alcoholic adult beverages have been around for many years, available low alcohol and non-alcoholic adult beverages have yet to provide satisfactory flavor profiles that can mimic or substitute for traditional alcoholic beverages.

For example, some methods of making low alcohol or non-alcoholic beverages include suppressing alcoholic fermentation in the production process, to thereby reduce the content of alcohol produced by the fermentation. Other methods include heating an alcoholic beverage to 175 degrees for 15 to 20 minutes, which causes the ethanol in the beverage to evaporate. However, these methods generally result in a low alcohol or non-alcoholic beverage that do not taste like their alcoholic counterparts. In many instances, the resulting low alcohol or non-alcoholic beverage either have very little flavor or taste so bad that they are undrinkable.

Accordingly, there is a need to produce low alcohol or non-alcoholic adult beverages that taste like their alcoholic counterparts and can mimic or substitute for traditional alcoholic beverages.

BRIEF SUMMARY

The present disclosure is directed to systems and processes for filtering organic compounds using nanoporous membranes and osmosis. In various implementations, the nanoporous membrane can be trained on one or more organic compounds such that the nanoporous membrane preferentially allows the one or more organic compounds to permeate the nanoporous membrane to the complete or substantial exclusion of one or more other compounds.

In some implementations, the nanoporous membrane is trained on alcohol such that the nanoporous membrane preferentially allows the alcohol to permeate the nanopores to the complete or substantial exclusion of other compounds, such as water or other compounds or mixtures. In some implementations, the nanoporous membrane is trained on ethanol such that the nanoporous membrane preferentially allows ethanol to permeate the nanopores to the complete or substantial exclusion of other compounds, such as water or other compounds or mixtures. In some implementations, the selective ethanol permeation of the nanoporous membrane may occur even where the other compounds may have smaller molecules than ethanol and these other compounds should have more easily passed through the nanoporous membrane over ethanol molecules.

Various implementations of the systems and methods may include separating an organic compound from a fluid, the method including one or more of the following: training a membrane with a first fluid on a first side of the membrane; applying a second fluid to the first side of the membrane, wherein the second fluid is in contact with the first side of the membrane and wherein the second fluid comprises at least one compound; applying a third fluid to the second side of the membrane; moving the second fluid across the first side of the membrane for a predetermined quantity of time at a first predetermined rate; moving the third fluid across the second side of the membrane for the predetermined quantity of time at a second predetermined rate; transferring the at least one compound from the second fluid to the third fluid through the membrane using forward osmosis; recovering the second fluid with at least a portion of the at least one compound removed from the second fluid.

In some implementations, the first fluid substantially comprises ethanol. In some implementations, the first fluid is ethanol. In some implementations, the first compound comprises substantially ethanol. In some implementations, when the at least one compound comprises ethanol, transferring the ethanol from the second fluid to the third fluid through the membrane using forward osmosis preferentially permits the ethanol to transfer to the third fluid while substantially excluding water from transferring to the third fluid through the membrane.

In some implementations, training the membrane further includes atomizing the first fluid; and applying a layer of the atomized first fluid on the first side of the membrane. In some implementations, one or more additional layers of the atomized first fluid are periodically reapplied one or more times to the first side of the membrane until the first fluid appears on the second side of the membrane. In some implementations, training the membrane further includes misting at least one layer of the first fluid on the first side of the membrane.

In some implementations, a pressure is applied to the second fluid on the first side of the membrane. In some implementations, a pressure is applied to the second fluid on the first side of the membrane with a gas. In some implementations, the gas is substantially an inert gas. In some implementations, the third fluid comprises water.

In some implementations, moving the second fluid across the first side of the membrane for the predetermined quantity of time at the first predetermined rate further comprises moving the second fluid tangentially across the first side of the membrane. In some implementations, moving the third fluid across the second side of the membrane for the predetermined quantity of time at the second predetermined rate further includes moving the third fluid tangentially across the second side of the membrane. In some implementations, the second fluid is moved across the first side of the membrane in a first direction and the third fluid is moved across the second side of the membrane in a second direction, wherein the first direction and the second direction are the same direction. In some implementations, the second fluid is moved across the first side of the membrane in a first direction and the third fluid is moved across the second side of the membrane in a second direction, wherein the first direction and the second direction are different directions. In some implementations, the first direction and the second direction are opposite directions. In some implementations, the third fluid is water and the water is moved across the second side of the membrane during the predetermined quantity of time. In some implementations, the second predetermined rate is in a range of 1 to 5 times faster than the first predetermined rate. In some implementations, the membrane comprises graphene oxide. In some implementations, the membrane further comprises a polymer.

It should be appreciated that in some implementations, the various methods and apparatuses discussed herein, when applied to alcoholic beverages, enables the production of low alcohol or non-alcoholic beverages that taste like their traditional alcoholic beverage counterparts. In some implementations, the methods and apparatuses discussed herein enable ethanol or ethyl alcohol to be substantially removed from an alcoholic beverage while substantially preventing other compounds from being removed from the alcoholic beverage. The resulting beverage can either contain low alcohol or substantially no alcohol, while retaining many or most of the compounds that give the original alcoholic beverage its signature taste. For example, if the methods and apparatuses discussed herein are applied to a brewed alcoholic beverage (e.g., a stout beer) to produce an altered stout beer, the altered stout beer continues to maintain the taste characteristics of the unaltered stout beer, while the altered stout beer has low or substantially no alcohol. As another example, if the methods and apparatuses discussed herein are applied to a distilled spirit like gin, the altered gin continues to maintain the taste characteristics of the unaltered gin, while the altered gin has low or substantially no alcohol. In other words, in some implementations, the novel methods and apparatuses discussed herein can produce a low alcohol or non-alcoholic beverage that tastes the same or very similar to their alcoholic counterparts and can mimic or substitute for traditional alcoholic beverages. As used herein, low alcohol beverages can contain 2.5% or less alcohol by volume (ABV), or 2% or less ABV, or 1% or less ABV, or 0.5% or less ABV.

DETAILED DESCRIPTION

Figure 1A:
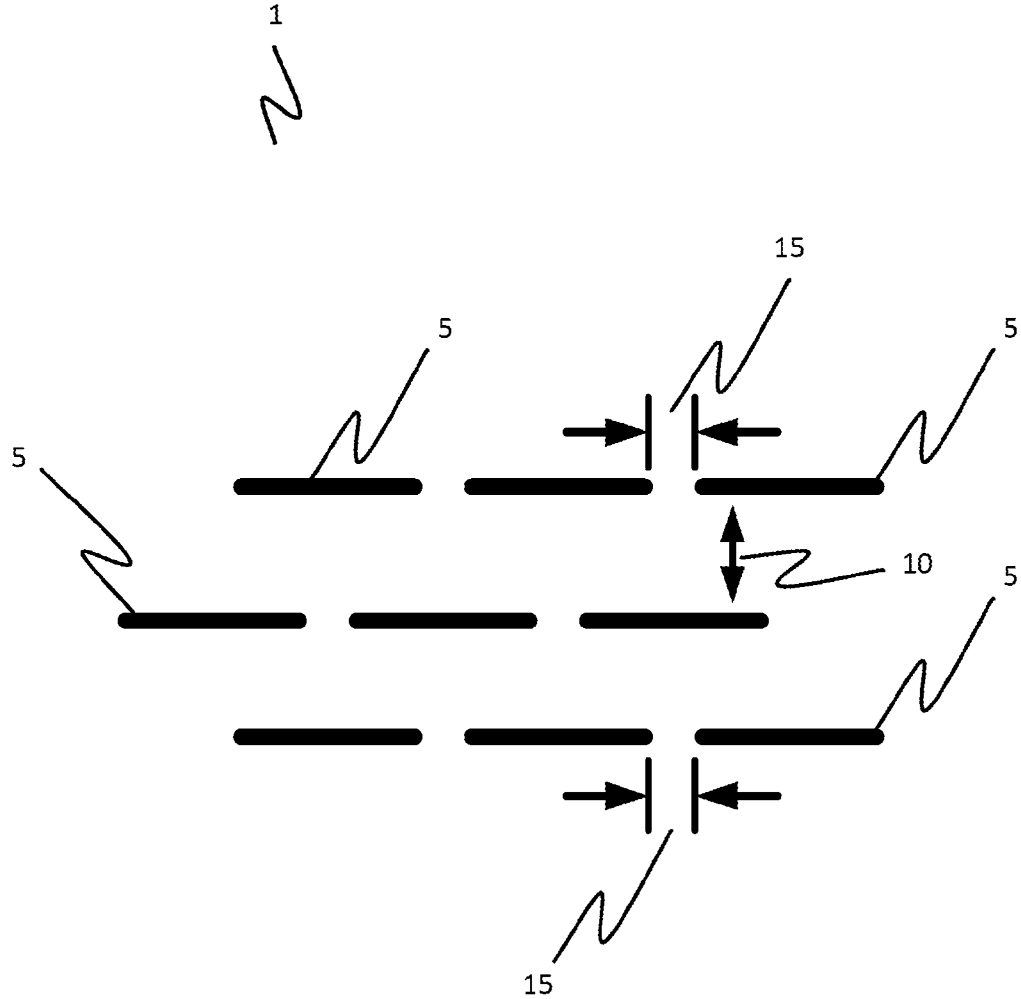
FIG. 1A shows a close-up schematic diagram of some layers of graphene oxide in accordance with some implementations.

Various implementations of inventive concepts relate to a process and apparatus to remove or separate compounds from fluids. In the context of this application, "separate" can be understood to mean to reduce the amount of a compound from a fluid, such that the final product or fluid has a lower amount of the compound as compared to the initial, starting fluid. In some implementations, the compound that is separated from a fluid can be partially, substantially, or even entirely removed from the fluid.

In some implementations, the removal or separation of organic compounds from a fluid includes removing or separating ethanol from a fluid, such as an alcoholic beverage (e.g., an alcoholic beverage produced through fermentation, brewing, distilling, etc.). In some implementations, the alcoholic beverage may include beer, wine, or liquor. In some implementations, the ethanol can be substantially or even entirely removed from an alcoholic beverage. In some implementations, the ethanol can be partially removed from an alcoholic beverage. In some implementations, when ethanol is separated from the fluid, only ethanol is separated. In some implementations, when ethanol is separated from the fluid, ethanol as well as one or more other compounds or products are also separated with the ethanol. In some implementations, a compound or product can be any chemical species. In some implementations, a compound or product can be any inorganic or organic molecule.

In some implementations, the separation process favors one organic compound over an inorganic compound despite the organic compound comprising molecules that are larger than the inorganic compound. In some implementations, the organic compound includes ethanol and the inorganic compound is substantially water.

In some implementations, the separation or removal of organic compounds from fluids includes using a membrane and osmosis. In some implementations, the membrane includes a nanoporous material. In some implementations, the membrane includes a nanoporous material combined with one or more other materials. In some implementations, the membrane may include one or more layers of graphene having a nanoporous structure. In some implementations, the membrane may include one or more layers of graphene oxide having a nanoporous structure. In some implementations, the one or more other materials may include one or more layers of an inorganic material. In some implementations, the one or more other inorganic materials may include one or more layers of a polymer with a porous structure. In some implementations, the one or more other materials may include one or more layers of an aerogel with a porous structure, which can create a mixing action near the surface of the membrane while fluids flow across the surface of the membrane. In some implementations, the separation/removal process is based on permselectivity of graphene oxide membranes that let ethanol preferentially permeate the membrane over water and/or other compounds to enable the removal/separation of ethanol from a fluid.

Graphene Oxide Membrane Formation

Some suitable methods of fabricating the membrane are disclosed below. It should be appreciated that other methods can also be used to fabricate the membrane.

In some implementations where the membrane comprises graphene oxide and a polymer, the graphene oxide and polymer are prepared by vacuum filtration of a graphene oxide water dispersion on the polymer. In some implementations, the process of preparing the graphene oxide includes starting with a water dispersion of graphene oxide. For example, the graphene oxide water dispersion can include 0.4% by weight graphene oxide (GO) flakes in water. In some implementations, a polymer, such as a polycarbonate track-etched membrane or sheet can be used. In some implementations, alternatives to the polymer membrane include, but are not limited to metallic mesh, aluminum, copper, active carbon.

In some implementations, the GO water dispersion (e.g., GO flakes in water) can be run through a centrifuge at low speed (e.g., 2000 rpm or some other suitable speed). In some implementations, the precipitated solid from the centrifuge process is discarded until the density of the dispersion is adjusted to approximately 1.003 mg L−1 (e.g., the remaining GO suspension). In some implementations, GO flakes larger than 10,000 nm can be discarded from the GO suspension. In some implementations, this density can be reached in about four cycles of centrifuge process (e.g., one cycle may include running a GO water dispersion through the centrifuge and discarding the precipitate). In some implementations, 1 mL of the remaining GO water dispersion from one or more cycles of the centrifuge process can be diluted up to, for example, a volume of 10 mL with water. In some implementations, the water is a substantially pure water. In some implementations, the water is an ultrapure water such as can be obtained from a Mili-Q™ purification system. It should be appreciated that the water can be combined with one or more other compounds or products in some implementations.

In some implementations, the GO suspension in water is sonicated in a sonicator bath for a predetermined period of time. In some implementations, the predetermined period of time of sonication can be 5 minutes or some other suitable time period.

In some implementations, the GO suspension can then be fed into a pressure filtration device that contains a polymer substrate or membrane. In some implementations, the pressure filtration device includes a feed side and a waste side. In some implementations, the feed side and the waste side of the pressure filtration device can be separated by a membrane, such as the polymer membrane discussed below. In some implementations, the waste side may include an outlet pipe and/or waste reservoir. In some implementations, the feed side may include an inlet pipe and/or a feed reservoir. For example, the GO suspension can be fed into a pressure filtration device that contains a polycarbonate sheet or membrane that will allow water molecules to pass, but capture or retain the GO in the water suspension. In some implementations, the polymer membrane can cover any suitable area and can be in a range of 20 μm to 30 μm in thickness. In some implementations, the polymer membrane can be approximately 24 μm in thickness. It should be appreciated that the thickness of the polymer membrane can be other suitable thicknesses depending on the application. For example, in higher pressure applications, the polymer membrane may be increased to add strength to the resulting structure to withstand added pressure. In some implementations, the polymer membrane can be characterized by porosity of about 4.7% and average pore size in a range of 10 nm to 1000 nm. In some implementations, the average pore size can be approximately 100 nm. It should be appreciated that other membranes with other suitable porosities can be used. In some implementations, the membrane is tested within the pressure filtration device to ensure that water does not leak from unintended areas of the pressure filtration device. In some implementations, the membrane within the pressure filtration device should be substantially leak free.

In some implementations, the GO water dispersion is added to the pressure filtration device and a pressure is applied to the GO water dispersion against the membrane in the pressure filtration device. In some implementations, the pressure is applied to the GO water dispersion with a gas, such as an inert gas like Argon. It should be appreciated that other suitable gasses can be used and other suitable mechanisms can be used to apply pressure to the GO water dispersion. In some implementations, using an inert gas like Argon, the gas is applied with a substantially constant pressure. For example, the gas may be applied with 1 bar of pressure in some implementations. In some implementations, once a flow of water (e.g., from the GO suspension) is detected on an outlet pipe of the pressure filtration device, the pressure can be increased. In some implementations, the pressure can be increased to 2.5 bars or some other suitable amount of pressure. In some implementations, the pressure can be higher or lower. In some implementations, some level of pressure is applied to the GO suspension in the pressure filtration device until water is removed and one or more layers of GO are applied to the membrane in the pressure filtration device. In some implementations, the process is complete when substantially all of the water from the GO suspension flows into the waste side of the pressure filtration device. In some implementations, a transparent solution of water is recovered from the waste side of the pressure filtration device when the fabrication of the GO layer(s) on the membrane proceeds appropriately (e.g., no tears or fissures are formed in the GO layers). It should be appreciated that in some implementations, a GO layer comprises one or more flakes of GO. In some implementations, multiple GO layers comprise layers of GO flakes. In some implementations, the remaining GO layer(s) are kept under pressure for a predetermined period of time. In some implementations, the predetermined period of time under pressure is 2 hours (or some other suitable period of time) after the last detectable water molecule is released from the pressure filtration device. In some implementations, the one or more GO layers in combination with the polymer membrane form a GO membrane (GOM). In some implementations, an aerogel layer can be added as a layer on top of the GO side of the GOM. In some implementations, the aerogel layer creates vertical structures on the surface of the GOM such that when fluid is flowed tangentially over the aerogel layer of the GOM, the vertical structures of the aerogel layer create a mixing action for the fluid flowing over the GOM to break up any concentration polarization (or gel polarization) layers that may build up in the fluid flow near the surface of the GOM. It should be appreciated that in some implementations, a GOM can be formed without an additional non-graphene based membrane layers (e.g., without the polymer membrane). That is, in some implementations, a GOM can be formed from one or more layers of GO flakes.

In alternative implementations, the GO layers (layers of GO flakes) can be made by alternative methods. For example, the GO layers can be prepared using the Hummers method (e.g., by treating natural graphite flakes and treating these flakes with potassium permanganate and sodium nitrate in concentrated sulphuric acid). Another alternative method of preparing the GO layers includes the Brodie method (adding potassium chlorate to a slurry of graphite in fuming nitric acid). The resulting GO can be added to a porous membrane support layer using alternative techniques such as spray coating, casting, dip coating. In some implementations, the GO layers or GOM can be made using a roller press method. A suspension of GO (e.g., GO flakes) can be placed on a flat surface and/or on a polymer membrane on a flat surface. The suspension of GO can then be squeezed through one or more rollers. In some implementations, the rollers flatten the suspension of GO into one or more GO layers. In some implementations where a polymer membrane is not used, the flattened GO layers can be peeled from the surface to reveal one or more layers of GO to form a GOM. In some implementations, where a polymer membrane is used, the one or more rollers can flatten the suspension of GO on the polymer membrane to form the GOM. In some implementations, a suspension of GO can be squeezed between two rollers to create a GOM of desired thickness. In some implementations, a suspension of GO on a polymer membrane can be passed between two rollers to create a GOM of desired thickness. In some implementations, the thickness of the GOM can be adjusted based on the spacing between a roller and a flat surface or the thickness of the GOM can be adjusted based on the spacing between the two rollers. In some implementations, the thickness of the GOM can be adjusted based on the pressure applied with a roller to a suspension of GO on a flat surface or the thickness of the GOM can be adjusted based on the pressure applied to a suspension of GO between the two rollers.

In some implementations, the GOM may include one or more layers of GO flakes. In some implementations, the GOM may include 10,000 layers of GO flakes. In accordance with inventive principles, the thickness of the layers of GO flakes in the GOM has an impact on selectivity of compounds. While it may seem that thinner layers of GO flakes should equate to more of a compound being filtered more easily from a liquid, a certain thickness of the GO flake layers may be needed to optimize filtration selectivity of a compound (e.g., selectively filtering ethanol from an alcoholic beverage). That is, in accordance with inventive aspects, a certain range of thickness of the layers of GO flakes can provide better filtration selectivity of a compound over thinner layers of GO flakes. For example, if the GO layers are too thin, the GO layers may not hold enough of a training compound to induce filtration selectivity (e.g., if the GOM is trained to selectively filter ethanol, if the layers of GO flakes in a GOM are not thick enough, the layers of GO flakes may not hold enough ethanol after a training period to selectively filter ethanol from an alcoholic beverage applied to one side of the GOM). In some implementations, the GO layers of thickness in a GOM is in a range of 100 nm to 5000 nm. In some implementations, the GO layers of thickness in a GOM is in a range of 200 nm to 4000 nm. In some implementations, the GO layers of thickness in a GOM is in a range of 300 nm to 3000 nm. In some implementations, the GO layers of thickness in a GOM is in a range of 400 nm to 2500 nm. In some implementations, the GO layers of thickness in a GOM is in a range of 500 nm to 2000 nm. In some implementations, the selection of the range of GO layer thickness can depend on one or more factors, such as temperature, type of liquid, type of compound that will be filtered from a liquid, altitude at which the process will be conducted, and the like. In some implementations, the GOM may include multiple layers of GO that, when combined, provide an overall thickness of GO layers in a range of about 10 μm to about 30 μm. In some implementations, when the surface area of a GOM is increased, the layers of GO flakes are increased, and the thickness is also increased. It should be appreciated that a GOM may have more or fewer layers of GO flakes.

In some implementations, the process of making the GOM includes using GO flakes having an average width in a desired range. For example, in some implementations, the GO flakes having an average width in a range of about 100 nm to about 10,000 nm, or about 200 nm to about 800 nm, or about 300 nm to about 600 nm, or about 400 nm to about 500 nm can be useful in accordance with inventive principles. In some implementations, GO flakes having a particular average width can be selected based upon such factors as, for example, temperature, type of liquid, type of compound that will be filtered from a liquid, altitude at which the method will be performed, and the like. In some implementations, the in-plane spacing and the inter-plane spacing of the GO flakes in the GOM can be significant to the process of filtering an organic compound. FIG. 1A illustrates reference 1, which is a closeup cross section view of a few layers of GO in a GOM in some implementations. The GO flakes 5 are layered upon each other and generally have in-plane spacing and inter-plane spacing with respect to each other. In some implementations, the GO flakes include an in-plane spacing 15 of approximately 2 nm. In some implementations, the GO flakes include an inter-plane spacing 10 of approximately 1 nm. In some implementations, a beneficial range of the inter-plane spacing between GO flakes is in a range of about 0.7 nm to about 1.5 nm. When the inter-plane spacing between GO flakes is less than 0.7 nm, then organic molecules such as ethanol will be restricted from passing through the GOM. When the inter-plane spacing between GO flakes is greater than 1.5 nm, then preferential passage of a particular organic molecule (e.g., ethanol) may be lost and unwanted molecules (e.g., water and/or other compounds) may be permitted to pass through the GOM along with the organic molecules that are desired to be filtered through the GOM. It should be appreciated that the method of forming the GOM discussed above is one way to achieve an appropriate in-plane and inter-plane spacing between the GO flakes and GO layers to permit the perm-selectivity.

In some implementations, GO flakes are formed from cooking a carbon-based material. In some implementations, the carbon-based material can be caramel. In some implementations, GO flakes can be made purer by at least partially removing oxygen from the carbon-based material used to form the GO flakes. In some implementations, oxygen can be removed from the GO using ascorbic acid during the process.

In some implementations, GO membrane production can be scaled up with larger quantities of suspension of GO. In some implementations, the scaled-up production of GO may include 9 mL of higher diluted dispersion of GO flakes diluted up to a total volume of 90 mL with water (e.g., purified water or other suitable water). The suspension of GO flakes in water is further sonicated in a sonicator bath for a predetermined period of time (e.g., 5 minutes) and then fed to a pressure filtration device that already contains a substrate membrane. The substrate membrane may comprise a surface area and be approximately 24 μm thick with a porosity of about 4.7% and average pore size of about 200 nm. It should be appreciated that other suitable water permeable membranes can be used as a substrate membrane.

Figure 1B:
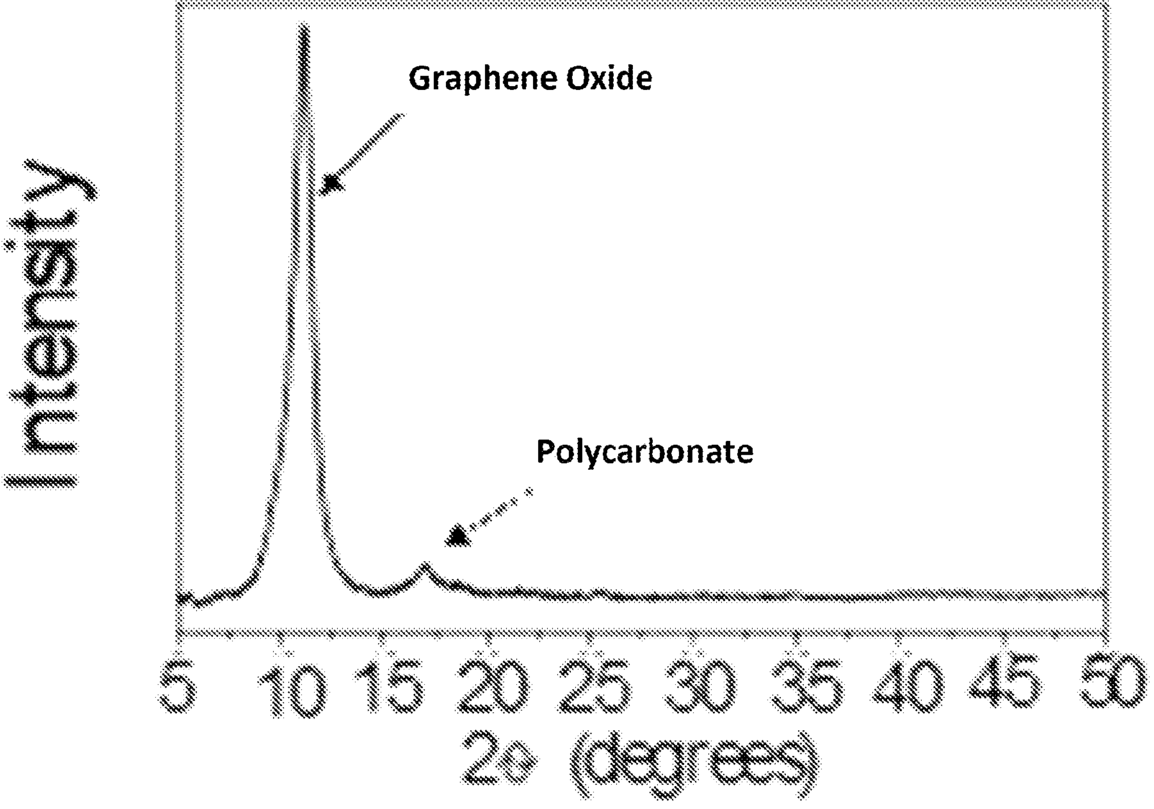
FIG. 1B shows an X-Ray diffractogram of a graphene oxide membrane in accordance with some implementations.

As previously noted, in some implementations, properly formed GO layers in a GOM substantially lacks cracks, tears, or fissures in the GO layers of the GOM. The structural characterization of properly formed GO films reveals an absence of such cracks, tears, or fissures throughout the GOM (while still including nanoporous regions in the GOM or GO layers. As illustrated in FIG. 1B, an X-Ray diffractogram of a GOM that shows the presence of GO as a broad/high peak substantially centered around 10 degrees is usually attributed to GO layers of the GOM having the absence of problematic cracks, tears, and/or fissures in some implementations. In some implementations, a low peak in the X-Ray diffractogram of the GO may indicate possible problems with the integrity of the GO layers of the GOM. FIG. 1B also shows the presence of a polycarbonate substrate with a second peak at 16. It is noted that even when the thickness of GO layers in the GOM is lower than a polycarbonate substrate in the GOM, the intensity in the X-Ray diffractogram may look higher because the measurement of the X-Rays is focused on the top layer GO (e.g., the GO layers) of the GOM.

GOM Filtration

Figure 2:
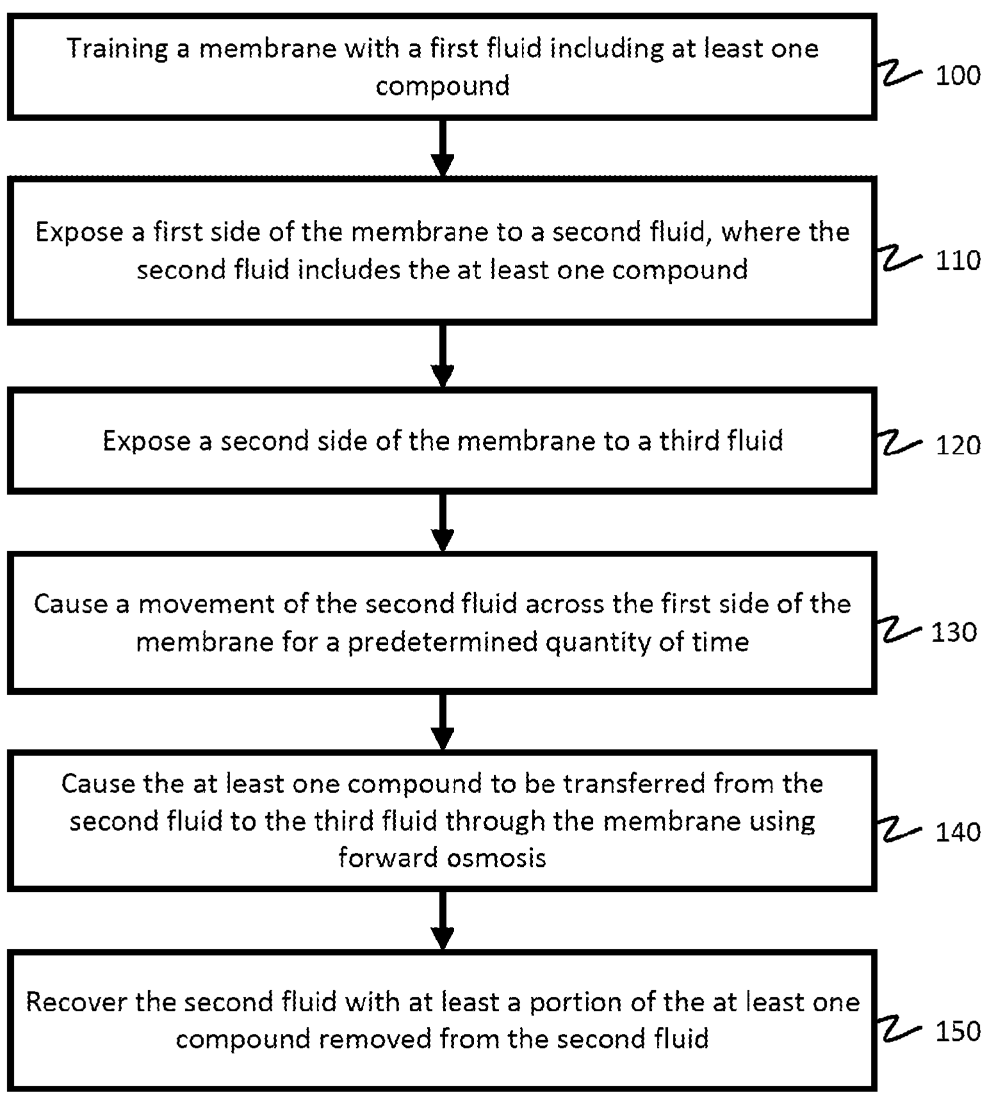
FIG. 2 shows a process diagram illustrating a method of filtering one or more compounds from a fluid in accordance with some implementations.

Turning to FIG. 2, a process diagram is shown illustrating a method of filtering one or more compounds from a fluid with a filtration system using a membrane in accordance with some implementations.

In some implementations, as shown in block 100, the process includes training a membrane with a first fluid including at least one compound (a training fluid). In some implementations, the membrane can be a GO based membrane, such as the GOM discussed above. While GOM is used as an illustrative membrane in the discussions below, it should be appreciated that other suitable membranes with the same or similar characteristics can be used. Training the GOM with a training fluid causes the GOM to preferentially permit the compound in the training fluid to more readily pass through the filter when later exposed to other fluids that contain the same type of compound from the training fluid. In some implementations, training a GOM includes exposing the GOM to a training fluid including at least one compound. In some implementations, the training fluid is a substantially purified form of the at least one compound. For example, training a GOM may include dipping a GOM in a training fluid of ethanol. In some implementations, the ethanol is substantially pure ethanol (e.g., 99% pure ethanol). It should be appreciated that the percentage of ethanol of the training fluid can be any suitable percentage. In some implementations, the percentage of ethanol of the training fluid is in a range of 30% to 100%. In some implementations, the training fluid is waste ethanol that was previously extracted from an alcoholic beverage, such as the ethanol extractions discussed herein. In some implementations, training the GOM in the training fluid includes allowing the training fluid to substantially soak into the nanoporous regions of the GOM. In some implementations, the GOM is soaked in the fluid for a predetermined amount of time. In some implementations, the predetermined amount of soaking time is 5 minutes. In some implementations, the thickness of the GOM may dictate how long the GOM is soaked in the training fluid. It should be appreciated that the predetermined amount of soaking time can be any suitable time. In some implementations, training the GOM with a training fluid includes substantially removing or replacing air or air bubbles in the nanoporous regions of the GOM with the training fluid. In some implementations, properties of the GOM may include enabling the GOM to retain all or at least a portion of the training fluid once the GOM is used to filter one or more compounds from a second liquid (as discussed below). That is, in some implementations, training a GOM enables the GOM to be saturated, which saturation can persist over time even as one or more compounds are passed through the GOM. In some implementations, at least a portion of the training fluid is retained in the GOM because the training fluid condenses within the interpores (or nanopores) of the GO layers of the GOM. It should be appreciated that in some implementations, none of the training fluid is retained in the GOM once the GOM is used to filter a second fluid. In some implementations, all or a portion of the training fluid in a GOM is replaced with one or more compounds filtered from a second fluid.

In some implementations, training the GOM may include exposing the GOM to the training fluid under a gravity feed. For example, the GOM may be positioned between a top feed vessel and a bottom waste vessel, where the GOM is sealed between an interface between the top feed vessel and the bottom waste vessel. In some implementations, the seal between the top feed vessel and the bottom waste vessel with the GOM prevents fluid leaks between the vessels except through the GOM. The top feed vessel can be filled with the training fluid, which exposes one side of the GOM to the training fluid. In some implementations, gravity may cause the training fluid to pass from the top feed vessel through the GOM to the bottom waste vessel. In some implementations, the GOM is properly trained on the training fluid when a flow rate of the training fluid through the GOM reaches a substantially steady state flow rate. It should be appreciated that a GOM can be trained when the flow rate of the training fluid is less than steady state in some implementations. In some implementations, it may be sufficient to have the bottom side of the GOM that interfaces with the bottom waste vessel substantially wetted with the training fluid.

In some implementations, training the GOM may include exposing the GOM to the training fluid under pressure. For example, the GOM may be positioned between a feed vessel and a waste vessel, where the GOM is sealed between the feed vessel and the waste vessel. In some implementations, the seal between the feed vessel and the waste vessel with the GOM prevents fluid leaks between the vessels except through the GOM. The feed vessel can be filled with the training fluid, which exposes one side (e.g., a first side) of the GOM to the training fluid. A vacuum can be applied to the waste vessel, which forcibly draws the training fluid through the GOM from the feed vessel to the waste vessel. In some implementations, training the GOM with a training fluid includes substantially saturating the nanoporous regions of the GOM with the training fluid. In some implementations, training the GOM with a training fluid also includes substantially removing or replacing air or air bubbles in the nanoporous regions of the GOM with the training fluid. In some implementations, the GOM is properly trained on the training fluid when a flow rate of the training fluid through the GOM reaches a substantially steady state flow rate. It should be appreciated that a substantially steady state flow rate through the GOM is indicative of substantially removing or replacing air or air bubbles in the nanoporous regions of the GOM with the training fluid. It should also be appreciated that a GOM can be sufficiently trained when the flow rate of the training fluid is less than steady state in some implementations. In some implementations, the other side (e.g., the second side or the waste vessel side) of the GOM should be substantially wet with the training fluid. In some implementations, the substantial saturation of the waste vessel side of the GOM prevents air bubbles or air pockets from forming on the surface of the waste vessel side of the GOM when another fluid or third fluid is added to the waste vessel, as is discussed below.

In some implementations, training the GOM may include exposing the GOM to the training fluid under pressure. For example, the GOM may be positioned between a feed vessel and a waste vessel, where the GOM is sealed between the feed vessel and the waste vessel. In some implementations, the seal between the feed vessel and the waste vessel with the GOM prevents fluid leaks between the vessels except through the GOM. The feed vessel can be filled with the training fluid, which exposes one side of the GOM to the training fluid. Pressure can be applied to the feed vessel and the training fluid, which forces the training fluid to pass from the feed vessel through the GOM to the waste vessel. In some implementations, pressure is applied with a gas on the feed vessel. In some implementations, the gas is an inert gas such as Argon. It should be appreciated that any suitable gas can be used to apply pressure on the feed vessel and the training fluid. In some implementations, training the GOM with a training fluid includes substantially saturating the nanoporous regions of the GOM with the training fluid. In some implementations, training the GOM with a training fluid also includes substantially removing or replacing air or air bubbles in the nanoporous regions of the GOM with the training fluid. In some implementations, the GOM is properly trained on the training fluid when a flow rate of the training fluid through the GOM reaches a substantially steady state flow rate. It should be appreciated that a substantially steady state flow rate through the GOM is indicative of substantially removing or replacing air or air bubbles in the nanoporous regions of the GOM with the training fluid. It should also be appreciated that a GOM can be trained when the flow rate of the training fluid is less than steady state in some implementations.

In some implementations, training the GOM may include misting the training fluid and forming a layer of the misted training fluid on one side of the GOM. After a predetermined period of time, training may further include adding another layer of misted training fluid on the same side of the GOM. In some implementations, adding an additional misted layer of the training fluid may continue until a predetermined amount of the training fluid appears to seep through to the opposite of the GOM (which may indicate that a substantially quantity of nanopores in the GOM have been saturated with the training fluid). In some implementations, adding additional one or more misted layers of the training fluid may continue until the opposite side of the GOM appears substantially saturated with the training fluid. In some implementations, the misting may include atomizing the training fluid. An advantage of atomizing the training fluid is the training fluid is broken into smaller droplets that more readily homogeneously wets the GOM and allows the training fluid to enter the nanopores of the GOM over larger droplets of the training fluid.

In some implementations, training the GOM may include one or more of the above processes used in combination with each other. For example, in some implementations, the training fluid can be placed under pressure on the feed vessel side while the waste vessel side can be under a vacuum. It should also be appreciated that one or more other additional processes can be used to train the GOM for a particular compound.

After the GOM is trained with the training fluid, excess training fluid (e.g., fluid not contained within the GOM) is removed from at least part of the filtration system. In some implementations, the training fluid should remain present within the GOM so that the GOM retains a preference for the compound in the training fluid. In some implementations, the surfaces of the GOM remain wet with the training fluid while adding the second fluid and the third fluid, as is discussed below. In some implementations, the GOM remains in a sealing position between the feed vessel and the waste vessel. It should be appreciated that in some implementations, the sealing position between the feed vessel and the waste vessel means that fluid leaks do not occur between the vessels except through the GOM. In some implementations, a trained GOM is placed in a sealing position between a new feed vessel and a new waste vessel.

As shown in block 110, a first side of the GOM is exposed to a second fluid, where the second fluid includes the at least one compound (e.g., the at least one compound being the same type of compound found in the training fluid). The second fluid includes an initial concentration of the at least one compound. For example, a first side of the GOM can be exposed to a second fluid that contains a plurality of compounds including, among other compounds, water and ethanol, where ethanol is the at least one compound used in the training fluid. In some implementations, the second fluid can be an alcoholic beverage (e.g., gin, whisky, vodka, wine, beer, etc.). For example, an alcoholic beverage can be placed in the feed vessel such that the alcoholic beverage is in physical contact with the first side of the GOM.

In some implementations, the filtration process includes exposing a second side (e.g., the other side or waste vessel side) of the GOM to a third fluid as shown in block 120. For example, the second side of the GOM can be exposed to a third fluid that contains at least one compound. In some implementations, the third fluid can be water. For example, water can be placed in the waste vessel such that the water is in physical contact with the second side of the GOM. In some implementations, the water is purified water. In some implementations, the purified water is Milli-Q™ water. In some implementations, the water can be tap water. In some implementations, the water may include one or more additional compounds (e.g., salts or other minerals) that may enhance an osmotic flow of compounds between the feed vessel and the waste vessel through the GOM. In some implementations, the third fluid is an alcoholic beverage in which the ethanol contents have been evaporated off through heating or cooking the alcoholic beverage. In some implementations, the third fluid is an alcoholic beverage in which the ethanol contents have been at least partially removed through the filtration process described herein. It should be appreciated that block 120 may occur before, substantially simultaneously with, or after block 110.

In some implementations, block 120 can be performed in a cross-flow structure, where exposure can include moving fluid across a surface of the GOM. For example, the third fluid can be injected with a pump (e.g., the pump can be internal or external to the waste vessel) into the waste vessel so that the third fluid runs tangentially across a second side of the GOM. The third fluid may further be removed from the waste vessel after running tangentially across the second side of the GOM. In some implementations, the third fluid may be pumped across the second side of the GOM (and removed) one or more times, where each time creates a cycle. For example, if a liter of a third fluid is pumped across the second side of the GOM and removed, the liter of the third fluid completed one cycle across the GOM. If the same liter of the third fluid is pumped across the second side of the GOM and removed a second time, the liter of the third fluid completed a second cycle across the GOM. In some implementations, the third fluid may be cycled continuously across the second side of the GOM. In some implementations, the third fluid may be cycled intermittently across the second of the GOM. In some implementations, the flow of the third fluid across the second side of the GOM is periodically stopped and restarted (within a cycle). In some implementations, the third fluid is pumped across the second side of the GOM and removed and not cycled back across the second side of the GOM. That is, in some implementations, fresh quantities of the third fluid are pumped across the second side of the GOM and are not recycled across the GOM.

In some implementations, at least a portion or substantially all air bubbles are prevented from forming on the second side of the GOM by ensuring that the second side of the GOM remains wet with the first fluid (e.g., the training fluid) before the third fluid is added to the waste vessel. In some implementations, when the second side of the GOM is wet with the first fluid when the third fluid is added to the waste vessel, the physical interface between a third fluid and the second side of the GOM remains substantially free of air bubbles. In some implementations, a substantially homogeneous third fluid and membrane interface (e.g., lacking air bubbles) can be particularly beneficial to maximizing the osmotic process that is described below.

In some implementations, as shown in block 130, the process includes causing a movement of the second fluid across the first side of the GOM for a predetermined quantity of time. In some implementations, the movement of the second fluid across the first side of the GOM includes applying a pressure to the second fluid within the feed vessel. In some implementations, the pressure can be 0.75 bars or less of pressure. In some implementations, the pressure can be above 0.75 bars. The predetermined quantity of time to continue movement of the second fluid may include 30 minutes, 1 hour, 8 hours, 24 hours, 48 hours, or some other suitable time period. In some implementations, the quantity of time relates to how much of the at least one compound in the second fluid is desired to be removed from the second fluid.

In some implementations, movement of the second fluid across the first side of the GOM can be achieved with a pump. For example, a pump can be included in the feed vessel. The pump may circulate the second fluid within the feed vessel, which in turn causes more of the second fluid to contact with the first side of the GOM. In some implementations, an aerator can be used with the filtration system. For example, an aerator can be used to induce a gas (e.g., an inert gas or other suitable gas) into the second fluid in the feed vessel to cause movement of second fluid within the feed vessel, which in turn causes more of the second fluid to contact with the first side of the GOM.

In some implementations, block 110 and 130 can be combined in a cross-flow structure. For example, the second fluid can be injected with a pump (e.g., the pump can be internal or external to the feed vessel) into the feed vessel so that the second fluid runs tangentially across the first side of the GOM. The second fluid may further be removed from the feed vessel after running tangentially across the first side of the GOM. In some implementations, the second fluid may be pumped across the first side of the GOM (and removed) one or more times, where each time creates a cycle. For example, if a liter of a second fluid is pumped across the first side of the GOM and removed, the liter of the second fluid completed one cycle across the GOM. If the same liter of the second fluid is pumped across the first side of the GOM and removed a second time, the liter of the second fluid completed a second cycle across the GOM. In some implementations, the second fluid may be cycled continuously across the first side of the GOM. In some implementations, the second fluid may be cycled intermittently across the first side of the GOM. In some implementations, the flow of the second fluid across the first side of the GOM is periodically stopped and restarted (within a cycle). In some implementations, the stopping and restarting aids in preventing or breaking a concentration or gel polarization layer that may form between the surface of the GOM and the second fluid. In some implementations using a cross-flow structure, the second fluid is pumped across the first side of the GOM while the third fluid is pumped across the second side of the GOM. In some implementations, the directional flow of the second fluid and the third fluid are the same. In some implementations, the directional flow of the second fluid and the third fluid are different (e.g., the flows can be in opposite directions). In some implementations, the rate that the third fluid is passed over the second side of the GOM is in a range of 1× to 5× faster than the rate that the second fluid is passed over the first side of the GOM. In some implementations, the rate is selected based on the type of liquid used for the second fluid. For example, when the second fluid includes a high concentration of ethanol and the ethanol needs to be selectively filtered, the rate of flow of the third fluid (e.g., water) should be kept high relative to rate of flow of the second fluid. In some implementations, a high concentration of ethanol in the second fluid that needs to be selectively filtered may cause the rate of flow of the third fluid to be selected at 5× the rate of flow of the second fluid. In some implementations, where the second fluid includes a high concentration of solids (e.g., wine or dark liquors), the flow rate of the third fluid may need to be reduced (e.g., 3×) relative to the rate of flow of the second fluid. In some implementations, where the second fluid includes a low concentration of ethanol that needs to be selectively filtered, the flow rate of the third fluid may need to be reduced (e.g., 2× or 1×) relative to the rate of flow of the second fluid.

In some implementations, movement of the second fluid across the first side of the GOM can be achieved with an ultrasonic transducer. For example, an ultrasonic transducer can be included in the feed vessel. In some implementations, an ultrasonic transducer can be included outside the feed vessel. The ultrasonic transducer can generate ultrasonic sound waves to circulate the second fluid within the feed vessel, which in turn causes more of the second fluid to contact with the first side of the GOM. In some implementations, the ultrasonic transducer can produce sounds waves above 20,000 Hz. In some implementations, movement of the second fluid across the first side of the GOM can be achieved with other types of transducers. In some implementations, the other types of transducers can produce sound waves that are between 20 Hz and 20,000 Hz. In some implementations, ultrasonic sounds waves can be applied to fluid in the cross-flow structure to further help break up or prevent the formation of a concentration or gel polarization layer between the GOM and the second fluid, or clogging of the GOM by suspended residues in the second fluid.

In some implementations, movement of the second fluid across the first side of the GOM can be achieved by physically moving the GOM.

It should be appreciated that one or more of the above mechanisms can be used in combination to cause movement of the second fluid across the first side of the GOM. It should also be appreciated that other suitable mechanisms can be used to move the second fluid across the first side of the GOM.

In some implementations, the process includes causing a movement of the third fluid across the second side of the GOM for a predetermined quantity of time as noted above. In some implementations, when not using a cross-flow structure, movement of the third fluid across the second side of the GOM can be achieved with a pump. In some implementations, alternative implementations, a pump can be used to circulate the third fluid within the waste vessel, which in turn causes more of the third fluid to contact with the second side of the GOM. In some implementations, an aerator can be used on the waste side of the filtration system. For example, an aerator can be used to induce gas (e.g., an inert gas or other suitable gas) into the third fluid in the waste vessel to cause movement of third fluid within the waste vessel, which in turn causes more of the third fluid to contact with the second side of the GOM. In some implementations, movement of the third fluid across the second side of the GOM can include physically moving the GOM.

In some implementations, as shown in block 140, when the second fluid is in the feed vessel and in contact with one side (e.g., the first side) of the GOM and the third fluid is in the waste vessel in contact with the other side (e.g., the second side) of the GOM, forward osmosis causes the at least one compound to be transferred from the second fluid to the third fluid through the GOM. In some implementations, due to training the GOM with the first fluid containing the at least one compound, the at least one compound contained in the second fluid is preferentially allowed to pass through the GOM from the feed vessel to the waste vessel, to the exclusion of one or more other compounds in the second fluid. The preferential passage of the at least one compound is unexpected especially in a situation where the second fluid comprises other compounds whose molecules are smaller than the at least one compound. In one example, where the training fluid is ethanol, ethanol comprises molecules that are larger than water. When the GOM is not trained, water and ethanol can pass through the GOM, with a preference to water. However, when the GOM is trained with ethanol, the GOM preferentially or selectively allows ethanol molecules to pass through its nanoporous structure, while blocking water molecules from passing through its nanoporous structure. Thus, when an alcoholic beverage is added to the feed vessel, the GOM permits ethanol to pass from the alcoholic beverage to the third fluid in the waste vessel while substantially blocking water and other compounds in the alcoholic beverage from passing through the GOM. In some implementations, the osmotic process can be aided by maintaining a temperature differential between the second fluid and the third fluid. In some implementations, the osmotic process can be further aided by adding one or more compounds to the third fluid (e.g., salt or other suitable compounds). In some implementations, the osmotic process can be aided by applying an electrical field to either the contents of the feed vessel or the contents of the waste vessel. In such implementations, a differential in electrical flux between of the feed vessel and the waste vessel may cause the osmotic process to increase. In some implementations, the third fluid or a fluid in the waste vessel can be positively or negatively charged to induce a faster osmotic process.

The forward osmosis process may be continued for any suitable period of time (e.g., cycling the second liquid and/or the third liquid across respective sides of the GOM). The quantity of time to continue the forward osmosis process between the second fluid in the feed vessel and the third fluid in the waste vessel may comprise 15 minutes, 20 minutes, 30 minutes, 1 hour, 8 hours, 24 hours, 48 hours, or some other suitable time period. In some implementations, the quantity of time relates to how much of the at least one compound in the second fluid is desired to be removed from the second fluid. In some implementations, the quantity of time relates to how much of the at least one compound in the second fluid is contained within the second fluid. In some implementations, the quantity of time relates to the surface area used for the GOM. In some implementations, a combination of factors can raise or lower the suitable period of time (e.g., a low percentage of ethanol in a feed vessel fluid in contact with a GOM having 1 square meter area may require less time to remove an equivalent percentage of ethanol from a low percentage of ethanol in a feed vessel fluid in contact with a GOM having 0.5 square meter area). In one example, when the feed vessel second fluid includes 50% by volume of ethanol to water, after 24 hours the concentration of ethanol can be decreased and equalized close to 25% by volume of ethanol in the fluids on both sides of the GOM.

In one example, when beer is used as the second fluid in the feed vessel, a substantial portion of ethanol can be removed within 24 hours. Beer typically includes between 3%-7% of ethanol by volume. In another example, when a similar volume of gin or other distilled beverage is used as the second fluid in the feed vessel, a longer time is required for the forward osmosis process to remove a similar percentage of ethanol from the distilled beverage, where distilled beverages can range between 20%-95% of ethanol by volume. It should be appreciated that as part of the osmosis process, the preferentially treated at least one compound attempts to equalize between the feed vessel fluid and the waste vessel fluid.

In some implementations, the waste vessel can be larger than the feed vessel, which allows the waste vessel to hold more of the third fluid by volume than the second fluid by volume in the feed vessel. In some implementations, maintaining a volume differentiation between the third fluid and the second fluid will cause more of the at least one compound to flow from the second fluid to the third fluid during osmosis while equalizing the percentage of the at least one compound between the second fluid and the third fluid. In some alternative implementations, the third fluid can be continuously replaced with fresh quantities of the third fluid to achieve a similar imbalance of the at least one compound in the waste vessel, as is done by using a larger waste vessel with a larger quantity of the third fluid than the feed vessel with a smaller quantity of the second fluid.

In some implementations, as shown in block 150, the second fluid is recovered with at least a portion of the at least one compound removed from the second fluid. The recovered second fluid may have a final concentration of the at least one compound that is between 0% and 100% less than the initial concentration, after completing the process outlined in FIG. 2. It should be appreciated that one or more compounds may be passed from the second fluid to the third fluid through the GOM during the forward osmosis process in some implementations.

In some implementations, a portion of the third fluid or waste fluid can be added back into the recovered second fluid, to the extent that the third fluid obtained one or more flavor compounds during the osmotic process.

Figure 3:
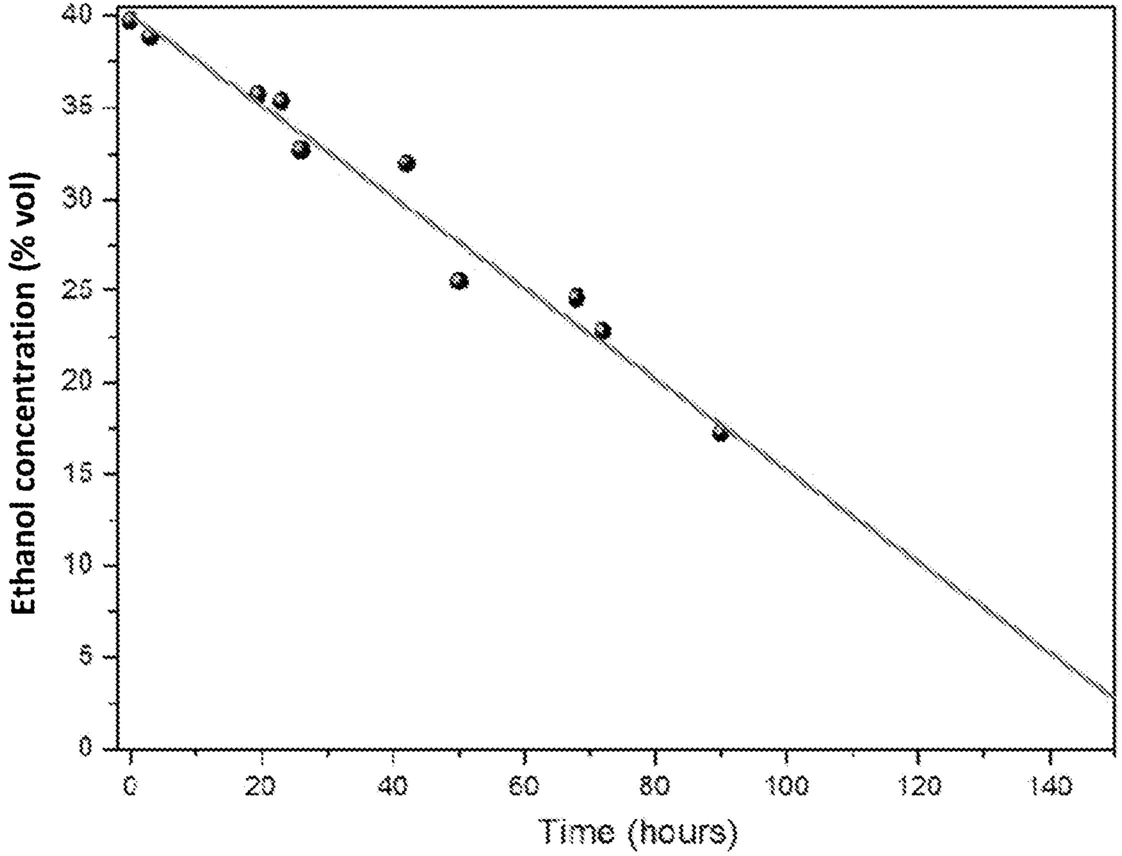
FIG. 3 shows ethanol concentration as a function of time when processed through one method of filtering ethanol in accordance with some implementations.

FIG. 3 shows an example time evolution of ethanol concentration by percentage volume in a feed vessel containing a second fluid (e.g., a distilled alcoholic beverage of Gin) determining a linear decay over 140 hours, where ethanol in the second fluid is removed or separated to the waste vessel containing purified water. In this illustration, initial concentration of ethanol at 0 hours is 40% by volume;

at 90 hours, final concentration of ethanol is approximately 17% by volume. Faster ethanol filtering can be achieved by changing certain aspects of the system (e.g., using larger surface area GOMs, running fluids over the GOM using cross-flow, etc.).

Figure 4A:
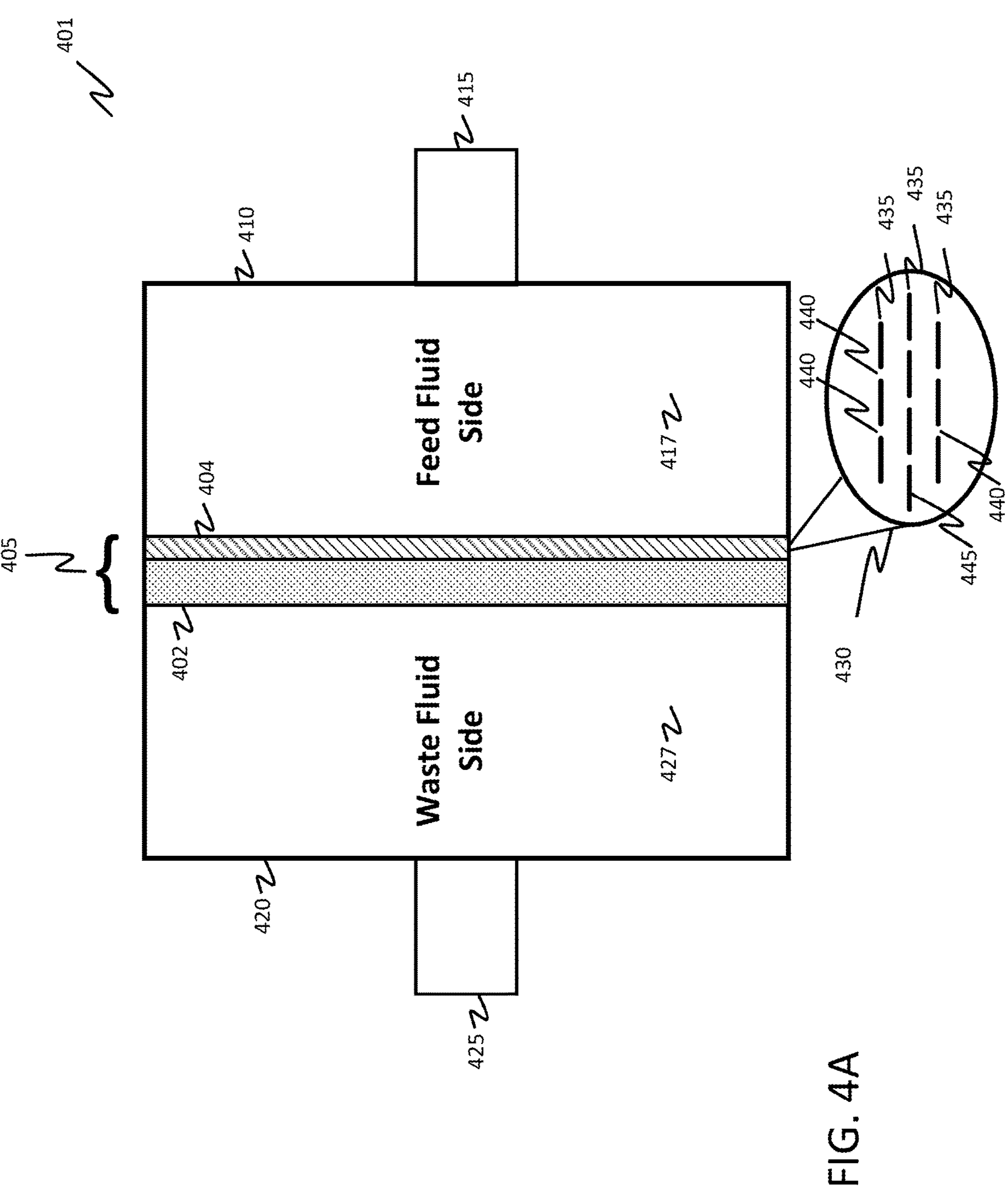
FIG. 4A shows a cutaway schematic diagram of a membrane separating fluid reservoirs for filtering one or more compounds from a fluid in accordance with some implementations.

FIG. 4A shows one implementation of a cutaway of a filtering system 400. The filtering system includes a membrane 405. In some implementations, the membrane 405 may include the GOM as previously discussed or another suitable membrane. In some implementations, the membrane 405 includes a substrate layer 402 and a GO layer 404. It should be appreciated that GO layer 404 and other discussions of a GO layer may include one or more layers of GO that form part of a GOM. In some implementations, the substrate layer can be formed from polycarbonate. In some implementations, the filtering system may include a feed vessel 410. The feed vessel may include one or more inlets 415. It should be appreciated that the inlets can also serve as outlets. The feed vessel 410 may receive the training fluid discussed above through the one or more inlets 415. The feed vessel may also receive the second fluid 417 discussed above through the one or more inlets 415.

In some implementations, the filtering system 400 also includes a waste vessel 420. The waste vessel may include one or more outlets 425. It should be appreciated that the outlets can also serve as inlets. The waste vessel 420 may receive the training fluid passing through the membrane 405. The waste vessel 420 may also receive the third fluid discussed above through the outlet 425. In some implementations, the waste vessel 420 may be larger than the feed vessel 410.

Reference 430 is an enlarged view of a small portion of the GO nanoporous structure. The GO may include one or more layers 435 of graphene flakes 445. The graphene flakes may include nanopores 440 of predetermined sizes that enable the GOM 405 to preferentially permit at least one compound in the second fluid 417 to pass through the GOM 405 with forward osmosis to the third fluid 427, while enabling one or more other compounds in the second fluid 417 to remain in the feed vessel 410.

In some implementations, the GOM 405 creates a sealing interface between the feed vessel 410 and the waste vessel 420. The sealing interface between the two vessels does not allow fluid to pass between the feed vessel 410 and the waste vessel 420 except through the GOM 405 in some implementations. It should be appreciated that while the GOM 405 appears to span the width of the interface between the feed vessel 410 and the waste vessel 420, the GOM 405 can be smaller than the width of the interface between the feed vessel 410 and the waste vessel 420.

For purposes of reference, the filtering system 400 can be used as discussed in connection with the filtering process described in FIG. 2. As another shortened example of the method described in FIG. 2, a training fluid (e.g., ethanol) can be added through the inlet 415 to the feed vessel 410. In some implementations, pressure can be applied to the training fluid through the inlet 415. In some implementations, a vacuum can also be applied to the outlet 425. The pressure on the training fluid and the vacuum on the waste vessel 420 will draw the training fluid through the GOM 405. In some implementations, the training fluid is drawn through the GOM 405 until the interface of the GOM on the waste vessel side has a steady state flow of the training fluid. In some implementations, the training fluid is drawn through the GOM 405 until the interface of the GOM 405 on the waste vessel side is substantially wet with the training fluid.

In some implementations, excess training fluid can be removed from the feed vessel 410 and replaced with a second fluid (e.g., a fluid containing at least ethanol and water). The interface of the GOM 405 on the feed vessel 410 should remain wet with the training fluid in some implementations. In some implementations, a third fluid (e.g., water) is also added to the waste vessel 420. In some implementations, the interface of the GOM 405 on the waste vessel 420 should remain wet with the training fluid when adding the third fluid. In some implementations, excess training fluid does not necessarily need to be removed from the waste vessel 420. In some implementations, excess training fluid is removed from the waste vessel 420 before adding the third fluid.

In some implementations, osmotic pressure causes the at least one compound in the second fluid in the feed vessel 410 to be drawn through the GOM 405 into third fluid in the waste vessel 420. In some implementations, the second fluid in the feed vessel 410 is moved within the feed vessel 410. In some implementations, a pressure is applied through the inlet 415 (e.g., using a gas) to the second fluid. As will be shown in other figures, alternative implementations may include a circulation pump in place of the added pressure or in combination with the added pressure. It should be appreciated that in some implementations, movement and/or pressure does not need to be applied to the second fluid for the osmotic process to work. However, in some implementations, the osmotic process may plateau or stall when the movement of the second fluid is not induced across the interface of the feed vessel with the GOM 405. After a suitable period of time (e.g., when a sufficient quantity of the at least one compound is separated/removed from the second fluid), the second fluid that is separated from at least a portion of the at least one compound can be recovered from the feed vessel 410. In some implementations, the second fluid can be recovered through the inlet 415 or some other suitable interface.

In some implementations, when the filtering system 400 is used with the process described in FIG. 2 on an alcoholic beverage, the nanoporous GOM can selectively remove compounds such as ethanol from an alcoholic beverage. In some implementations, the ethanol by volume can be at least partially reduced from an alcoholic beverage. In some implementations, the ethanol by volume can be substantially reduced from an alcoholic beverage. Because the GOM can selectively separate ethanol from an alcoholic beverage without heating the alcoholic beverage and without altering the process of making the alcoholic beverage (e.g., whether by brewing, fermentation, or by distillation), the ethanol content can be reduced or removed from the alcoholic beverage without a discernable change in the flavor profile in some implementations.

Figure 4B:
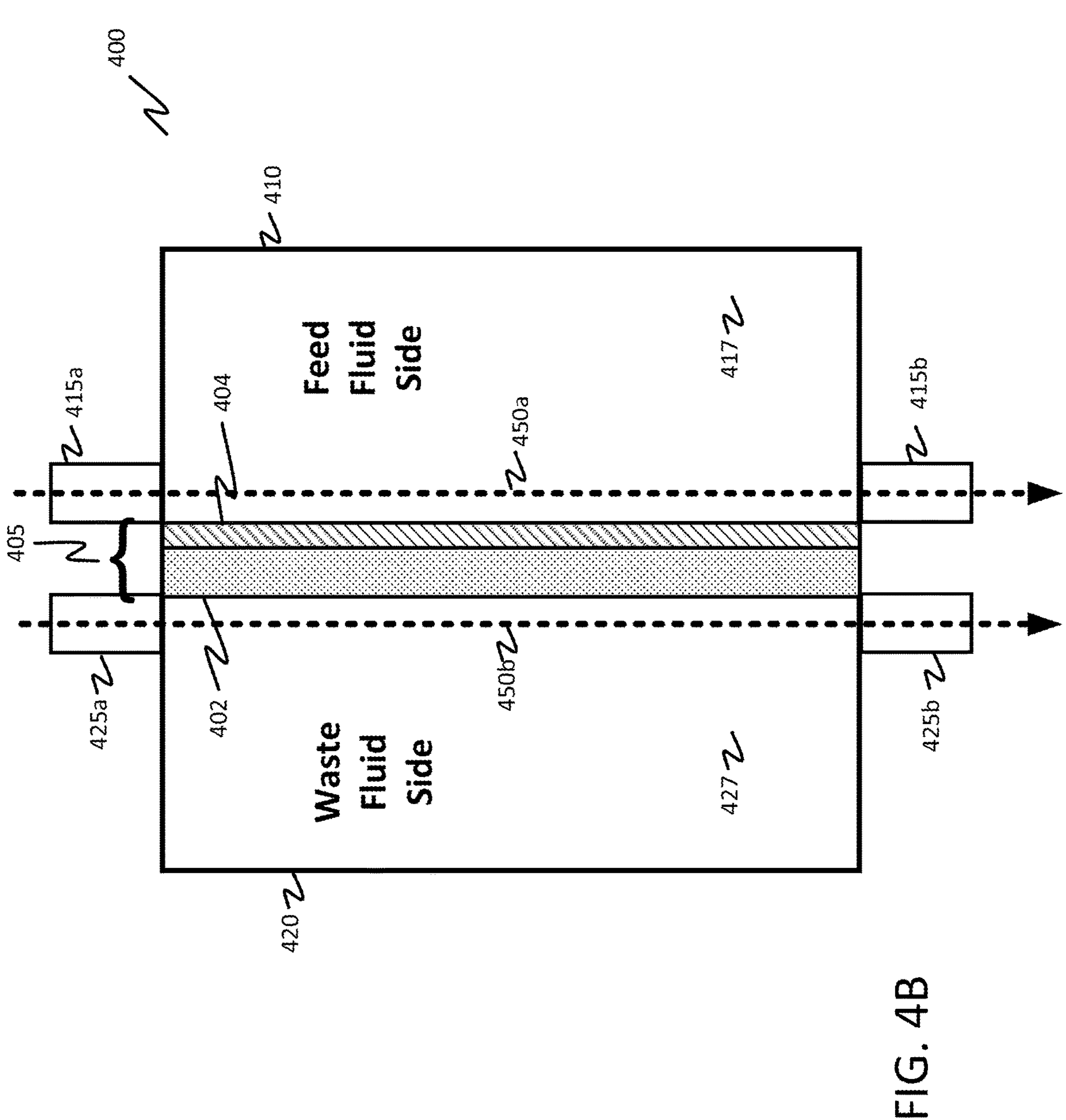
FIG. 4B shows a cutaway schematic diagram of a membrane separating fluid reservoirs for filtering one or more compounds from a fluid in accordance with some implementations.

FIG. 4B shows one implementation of a cutaway of an alternative filtering system 401 implementing a cross-flow configuration from the filtering system illustrated in FIG. 4A. Many elements of FIG. 4B are the same as elements in FIG. 4A and will be referred to using the same reference numbers. In a cross-flow configuration, the feed fluid and waste fluid are pushed tangentially across different sides of the GOM. The filtering system includes a membrane 405. In some implementations, the membrane 405 may include the GOM as previously discussed or another suitable membrane. In some implementations, the membrane 405 includes a substrate layer 402 and a GO layer 404 (e.g., one or more layers of GO or GO flakes). In some implementations, membrane 405 includes GO layer 404 without a substrate layer 4021*n* some implementations, one or more additional layers may be included in membrane 405. For example, as discussed above, an aerogel layer or another material can be included on GO layer 404 to create a mixing action as feed fluid is pushed across the surface of the GO layer 404. In some implementations, the material to create the mixing action of the feed fluid can be formed on the surface of the GO layer 404 as spacers. In some implementations, the substrate layer can be formed from polycarbonate.

In some implementations, the filtering system may include a feed vessel 410. The feed vessel may include one or more inlets 415*a*. The feed vessel may include one or more outlets 415*b*. It should be appreciated that the inlets can also serve as outlets and outlets can serve as inlets. The feed vessel 410 may receive the second fluid 417 discussed above through the one or more inlets 415*a*. In some implementations, a pump (not shown) may push the second fluid 417 through an inlet 415*a* and tangentially across the surface of the GO layer 404 of GOM 405. The second fluid 417 may exit the feed vessel 410 through one or more outlets 415*b*. In some implementations, the pump or some other mechanism may be used to add pressure to the second fluid 417 or pressure to the feed vessel 410 such that pressure is placed on the second fluid 417 as it flows across the surface of the GO layer 404.

In some implementations, the filtering system 400 also includes a waste vessel 420. In some implementations, the waste vessel may include one or more inlets 425*a*. In some implementations, the waste vessel may include one or more outlets 425*b*. It should be appreciated that the outlets can also serve as inlets and the inlets can serve as outlets. The waste vessel 420 may receive the third fluid 427 discussed above through the one or more inlets 425*a*. In some implementations, a pump (not shown) may push the third fluid 427 through an inlet 425*a* and tangentially across the surface of the substrate layer 402 of GOM 405. The third fluid 427 may exit the waste vessel 420 through one or more outlets 425*b*. In some implementations, the waste vessel 420 may be larger than the feed vessel 410. In some implementations, the waste vessel 420 may be smaller than the feed vessel 410. In some implementations, the waste vessel 420 and the feed vessel 410 may be the same size or substantially the same size.

In some implementations, the GOM 405 is sandwiched between the feed vessel 410 and the waste vessel 420 to create a sealing interface between the two vessels. The sealing interface between the two vessels does not allow fluid to pass between the feed vessel 410 and the waste vessel 420 except through the GOM 405 in some implementations. It should be appreciated that while the GOM 405 appears to span the width of the interface between the feed vessel 410 and the waste vessel 420, the GOM 405 can be smaller than the width of the interface between the feed vessel 410 and the waste vessel 420.

In some implementations, before the GOM 405 is placed between the feed vessel 410 and the waste vessel 420, one or more layers of training fluid are misted or atomized on one side of the GOM 405 to train the GOM for selectivity of a particular compound. For example, one or more layers of training fluid are misted or atomized on the GO layer 404 as discussed above in connection with FIG. 2 (e.g., until the GOM 405 is sufficiently trained with the training fluid to selectively filter compounds that are the same or similar to the training fluid). In some implementations, the GOM 405 can be trained with the misting or atomization process while sandwiched between the feed vessel 410 and the waste vessel 420.

For purposes of reference, the filtering system 401 can be used as discussed in connection with the filtering process described in FIG. 2. As another shortened example of the method described in FIG. 2, one or more layers of a training fluid (e.g., ethanol) can be atomized over the surface of the GO layer 404 of the GOM 405. In some implementations, pressure can be applied to the feed vessel 410 to help pass the misted or atomized training fluid through the GOM 405. In some implementations, a vacuum can also be applied to the waste vessel 420 that may further help pass the misted or atomized training fluid from one side of the GOM 405 to the other. In some implementations, the training fluid is applied to GOM 405 until the interface of the GOM is sufficiently saturated with the training fluid. In some implementations, for example, training fluid is misted or atomized on the GO layer 404 until the interface of the GOM 405 on the waste vessel side is substantially wet with the training fluid.

In some implementations, excess training fluid can be removed from the surface of the GO layer 404. The interface of the GOM 405 on the feed vessel 410 should remain wet with the training fluid in some implementations. In some implementations, a second fluid 417 (e.g., a fluid containing at least ethanol and water) is pumped across the GO layer 404 of the GOM 405 in the feed vessel 410 through inlet 415*a* as shown by directional arrow 450*a*. In some implementations, the second fluid 417 exits the feed vessel 410 through outlet 415*b* as shown by direction arrow 450*a*. In some implementations, a third fluid 427 (e.g., water) is pumped across the substrate layer 402 of the GOM 405 in the waste vessel 420 through inlet 425*a* as shown by directional arrow 450*b*. In some implementations, the second fluid 427 exits the waste vessel 420 through outlet 425*b* as shown by directional arrow 450*b*. In some implementations, the interface of the GOM 405 on the waste vessel 420 should remain wet with the training fluid when adding the third fluid. In some implementations, excess training fluid does not necessarily need to be removed from the surface of the substrate layer 402 in the waste vessel 420 because the flow of the third fluid 427 may remove the excess training fluid. In some implementations, excess training fluid is removed from the waste vessel 420 before the third fluid is pumped across the surface of the substrate layer 402. It should be appreciated that flow rates and flow directions of the second and third fluids may vary as discussed above in connection with FIG. 2. It should also be appreciated that the flow of either the second fluid 417 and/or the third fluid 427 can be periodically stopped and restarted. This may help break up or reduce clogging of the GOM by suspended residues or the occurrence of a concentration or gel polarization layer from building up on the GO layer 404 side of the GOM 405. In some implementations, the stopping and restarting of the fluid flows can be accomplished with short or long pulsed flow. In some implementations, vibrations (ultrasonic or otherwise) can be introduced to the flowing fluids to help break up or reduce clogging of the GOM by suspended residues or the occurrence of a concentration or gel polarization layer from building up on the GO layer 404 side of the GOM 405.

In some implementations, forward osmotic pressure causes the at least one compound in the second fluid 417 pumped across the surface of the GO layer 404 in the feed vessel 410 to be drawn through the GOM 405 into the third fluid 427 that is pumped across the substrate layer 402 in the waste vessel 420. After a suitable period of time (e.g., after one or more cycles of pumping the second and third fluid through the respective vessels and/or when a sufficient quantity of the at least one compound is separated/removed from the second fluid, etc.), the second fluid 417 that is separated from at least a portion of the at least one compound can be recovered. The second fluid 417 with at least a portion or all of the at least one compound removed can be recovered from the outlet 415*b*.

In some implementations, when the filtering system 400 is used with the process described in FIG. 2 on an alcoholic beverage, the nanoporous GOM can selectively remove compounds such as ethanol from an alcoholic beverage. In some implementations, the ethanol by volume can be at least partially reduced from an alcoholic beverage. In some implementations, the ethanol by volume can be substantially reduced from an alcoholic beverage. Because the GOM can selectively separate ethanol from an alcoholic beverage without heating the alcoholic beverage and without altering the process of making the alcoholic beverage (e.g., whether by brewing, fermentation, or by distillation), the ethanol content can be reduced or removed from the alcoholic beverage without a discernable change in the flavor profile in some implementations.

Figure 5:
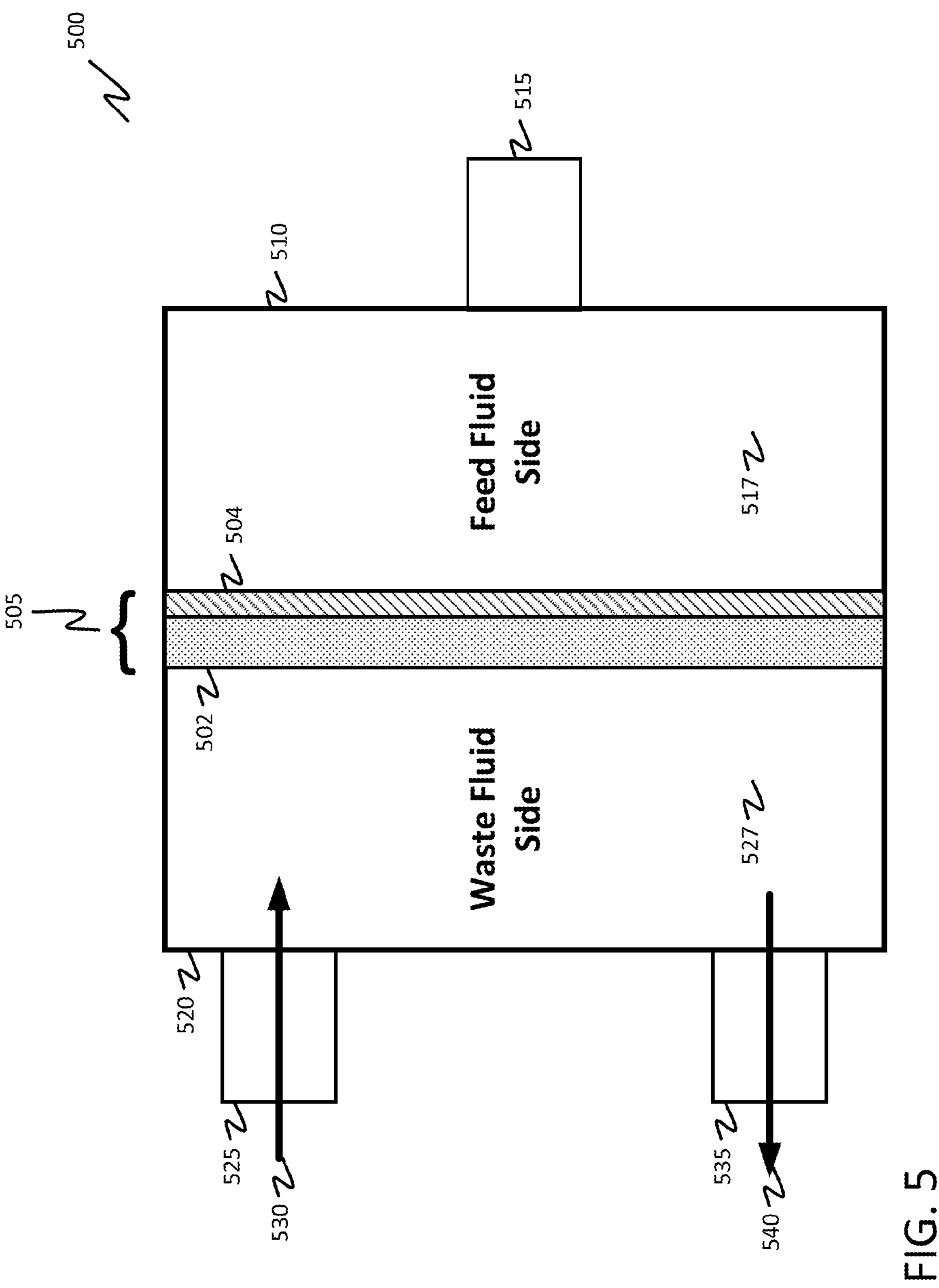
FIG. 5 shows a cutaway schematic diagram of a membrane separating fluid reservoirs for filtering one or more compounds from a fluid in accordance with some implementations.

FIG. 5 shows one implementation of a cutaway of a filtering system 500. The filtering system 500 is similar to the filtering system described in connection with FIG. 4A with a few changes, discussed herein below. The filtering system includes a membrane 505. In some implementations, the membrane 505 may include the GOM as previously discussed or another suitable membrane. In some implementations, the membrane 505 includes a substrate layer 502 and a GO layer 504. In some implementations, the substrate layer can be formed from polycarbonate. In some implementations, the filtering system may include a feed vessel 510. The feed vessel may include one or more inlets 515. It should be appreciated that the inlets can also serve as outlets. The feed vessel 510 may receive the training fluid discussed above through the one or more inlets 515. The feed vessel may also receive the second fluid 517 discussed above through the one or more inlets 515.

In some implementations, the filtering system 500 also includes a waste vessel 520. The waste vessel 520 may include one or more outlets 525 and 535. It should be appreciated that the outlets can also serve as inlets. The waste vessel 520 may receive the training fluid passing through the membrane 505. The waste vessel 520 may also receive the third fluid discussed above through the outlet 525. Arrows 530 and 540 illustrate one possible direction flow of the third fluid that can be added to the waste vessel 520. As noted in connection with FIG. 2, a third fluid can be refreshed or flushed within the waste vessel 520. For example, the third fluid can be removed from the waste vessel 520 in a closed loop or in an open loop system. In some implementations, this may carry the at least one compound that is added to the third fluid during the osmotic process away, which can keep the third fluid out of balance with respect to the at least one compound contained in the second fluid that flows through the membrane 505 (causing more of the at least one compound contained in the second fluid to flow to the third fluid). In some implementations, the third fluid can be refreshed or replaced within the waste vessel 520 periodically (e.g., once a minute, once an hour, once a day, or some other suitable time period). In some implementations, replacing the third fluid within the waste vessel 520 may enable the waste vessel to remain smaller than otherwise would have been required to dilute the at least one compound captured through the osmotic process.

While not shown, in some implementations, the filter system 500 may include one or more inlets/outlets for the feed vessel 510 to refresh or flush the second fluid in the feed vessel 510. In some implementations, the second fluid in the feed vessel 510 can be refreshed or flushed continuously or periodically during the osmotic process to remove the at least one compound from the second fluid. For example, the second fluid can be removed from the waste vessel 520 in an open loop system and refreshed with new quantities of the second fluid. As another example, the second fluid can be recycled through the waste vessel 520 in a closed loop system.

In some implementations, the membrane 505 creates a sealing interface between the feed vessel 510 and the waste vessel 520. In some implementations, the sealing interface between the two vessels does not allow fluid to pass between the feed vessel 510 and the waste vessel 520 except through the membrane 505. It should be appreciated that while the membrane 505 appears to span the width of the interface between the feed vessel 510 and the waste vessel 520, the membrane 505 can be smaller than the width of the interface between the feed vessel 510 and the waste vessel 520.

For purposes of reference, the filtering system 500 can be used as discussed in connection with the filtering process described in FIG. 2.

Figure 6:
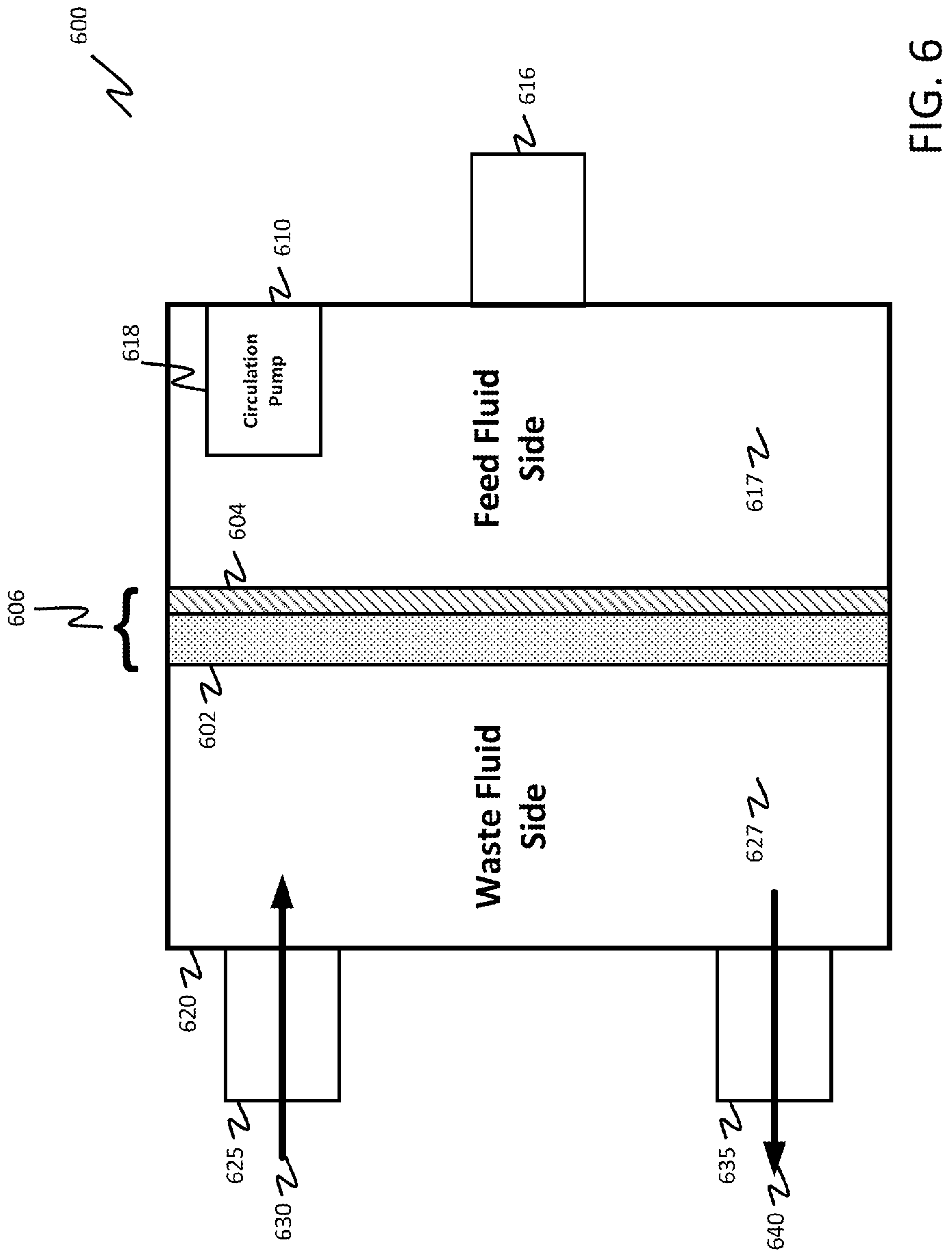
FIG. 6 shows a cutaway schematic diagram of a membrane separating fluid reservoirs for filtering one or more compounds from a fluid in accordance with some implementations.

FIG. 6 shows one implementation of a cutaway of a filtering system 600. The filtering system 600 is similar to the filtering system described in connection with FIG. 4A with a few changes, discussed herein below. The filtering system includes a membrane 606. In some implementations, the membrane 606 may include the GOM as previously discussed or another suitable membrane. In some implementations, the membrane 606 includes a substrate layer 602 and a GO layer 604. In some implementations, the filtering system may include a feed vessel 610. The feed vessel may include one or more inlets 616. It should be appreciated that the inlets can also serve as outlets. The feed vessel 610 may receive the training fluid discussed above through the one or more inlets 616. The feed vessel may also receive the second fluid 617 discussed above through the one or more inlets 616. In some implementations, the filtering system may include a circulation pump 618. In some implementations, the circulation pump is included within the feed vessel 610. In some implementations, the circulation pump 618 in located outside of the feed vessel 610. In some implementations, the circulation pump 618 may be used to circulate fluids added to the feed vessel 610 so that more of the second fluid interfaces/comes in contact with the first side of the GOM. As discussed above, in some implementations, fluids can be moved using other suitable mechanisms such as a sonic agitator, mechanically moving the GOM, physically moving the vessels that hold the fluids.

In some implementations, the filtering system 600 also includes a waste vessel 620. The waste vessel 620 may include one or more outlets 625 and 635. It should be appreciated that the outlets can also serve as inlets. The waste vessel 620 may receive the training fluid passing through the membrane 606. The waste vessel 620 may also receive the third fluid discussed above through the outlet 625. Arrows 630 and 640 illustrate one possible direction flow of the third fluid that can be added to the waste vessel 620. As noted in connection with FIG. 2, a third fluid can be refreshed within the waste vessel 620. In some implementations, this may carry away/remove from the waste vessel 620 the at least one compound that is added to the third fluid during the osmotic process. In some implementations, refreshing the third fluid can keep the at least one compound in the third fluid out of balance with respect to the at least one compound contained in the second fluid, which can enhance the osmotic process. In some implementations, the third fluid can be refreshed within the waste vessel 620 periodically. While not shown, it should be appreciated that the waste vessel 620 may similarly include a circulation pump inside or outside of the waste vessel 620, as described above with respect to the feed vessel 610.

In some implementations, the membrane 606 creates a sealing interface between the feed vessel 610 and the waste vessel 620. In some implementations, the sealing interface between the two vessels does not allow fluid to pass between the feed vessel 610 and the waste vessel 620 except through the membrane 606. It should be appreciated that while the membrane 606 appears to span the width of the interface between the feed vessel 610 and the waste vessel 620, the membrane 606 can be smaller than the width of the interface between the feed vessel 610 and the waste vessel 620 in some implementations.

For purposes of reference, the filtering system 600 can be used as discussed in connection with the filtering process described in FIG. 2.

Figure 7:
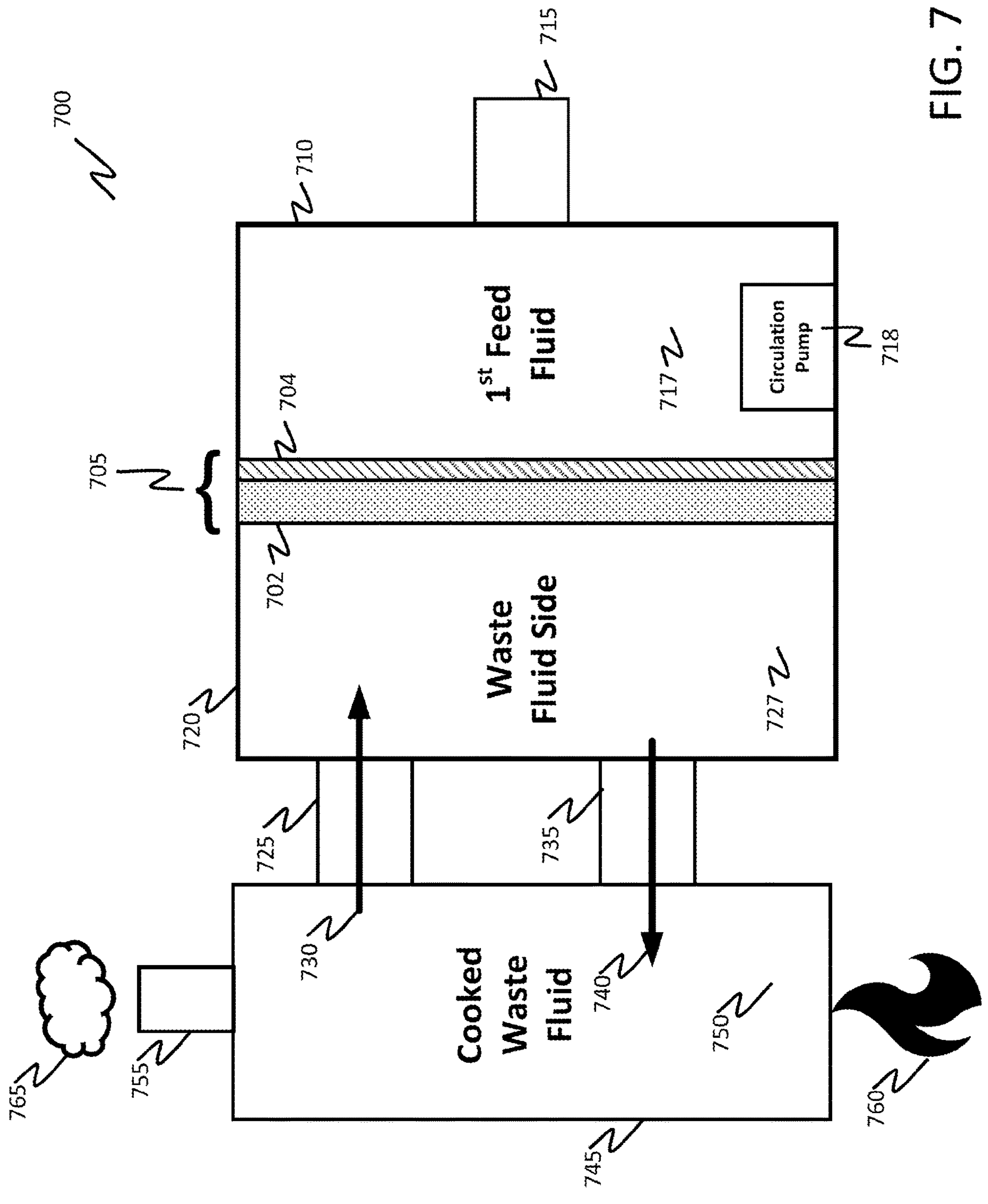
FIG. 7 shows a cutaway schematic diagram of a membrane separating fluid reservoirs for filtering one or more compounds from a fluid with an additional fluid reservoir for additional fluid processing in accordance with some implementations.

FIG. 7 shows one implementation of a cutaway of a filtering system 700. The filtering system 700 is similar to the filtering system described in connection with FIG. 4A with a few changes, discussed herein below. The filtering system includes a membrane 705. In some implementations, the membrane 705 may include the GOM as previously discussed or another suitable membrane. In some implementations, the membrane 705 includes a substrate layer 702 and a GO layer 704. In some implementations, the filtering system may include a feed vessel 710. The feed vessel may include one or more inlets 717. It should be appreciated that the inlets can also serve as outlets. The feed vessel 710 may receive the training fluid discussed above through the one or more inlets 717. The feed vessel may also receive the second fluid 717 discussed above through the one or more inlets 717. In some implementations, the filtering system may include a circulation pump 718. In some implementations, the circulation pump is included within the feed vessel 710. In some implementations, the circulation pump in located outside of the feed vessel 710. In some implementations, the circulation pump may be used to circulate fluids added to the feed vessel 710.

In some implementations, the filtering system 700 also includes a waste vessel 720. The waste vessel 720 may include one or more outlets 725 and 735. It should be appreciated that the outlets can also serve as inlets. The waste vessel 720 may receive the training fluid passing through the membrane 705. The waste vessel 720 may also receive the third fluid discussed above through the outlet 725. Arrows 730 and 740 illustrate one possible direction flow of the third fluid that can be added to the waste vessel 720. As noted in connection with FIG. 2, a third fluid can be refreshed within the waste vessel 720. In some implementations, this may carry away/remove the at least one compound that is added to the third fluid during the osmotic process, which can keep the at least one compound in the third fluid out of balance with respect to the at least one compound contained in the second fluid. In some implementations, the third fluid can be refreshed within the waste vessel 720 periodically. While not shown, it should be appreciated that the waste vessel 720 may similarly include a circulation pump inside or outside of the waste vessel 720, as described above with respect to the feed vessel 710.

In some implementations, the membrane 705 creates a sealing interface between the feed vessel 710 and the waste vessel 720. In some implementations, the sealing interface between the two vessels do not allow fluid to pass between the feed vessel 710 and the waste vessel 720 except through the membrane 705. It should be appreciated that while the membrane 705 appears to span the width of the interface between the feed vessel 710 and the waste vessel 720, the membrane 705 can be smaller than the width of the interface between the feed vessel 710 and the waste vessel 720.

In some implementations, the filtering system 700 may include a heating vessel 745. In some implementations, the heating vessel 745 may include a fourth fluid 750. In some implementations, the fourth fluid 750 can be a same or similar fluid as the second fluid 717. For example, if the second fluid 717 is a whisky, the fourth fluid 750 can also be the same whisky or a different whisky. In some implementations, the heating vessel 745 includes a heating element 760 or can receive an application of heat. In some implementations, the heating element 760 can heat or otherwise cook the fourth fluid 750. In some implementations, it may be desirable to evaporate ethanol compounds in the fourth fluid 750, such as by way of heating the fourth fluid 750. The fourth fluid can be circulated through the waste vessel 720 using any suitable mechanism, such as a pump or relying on the temperature differential to circulate the fourth fluid 750 to the heating vessel 745. Inlet/outlet 755 may be used to add the fourth fluid 750 to the heating vessel 745. Inlet/outlet 755 may also be used to release evaporated ethanol or other compounds 765 from the fourth fluid 750. It should be appreciated that the heating vessel 745 may include other suitable inlets/outlets to accommodate different functions.

For purposes of reference, the filtering system 700 can be used as discussed in connection with the filtering process described in FIG. 2.

Figure 8:
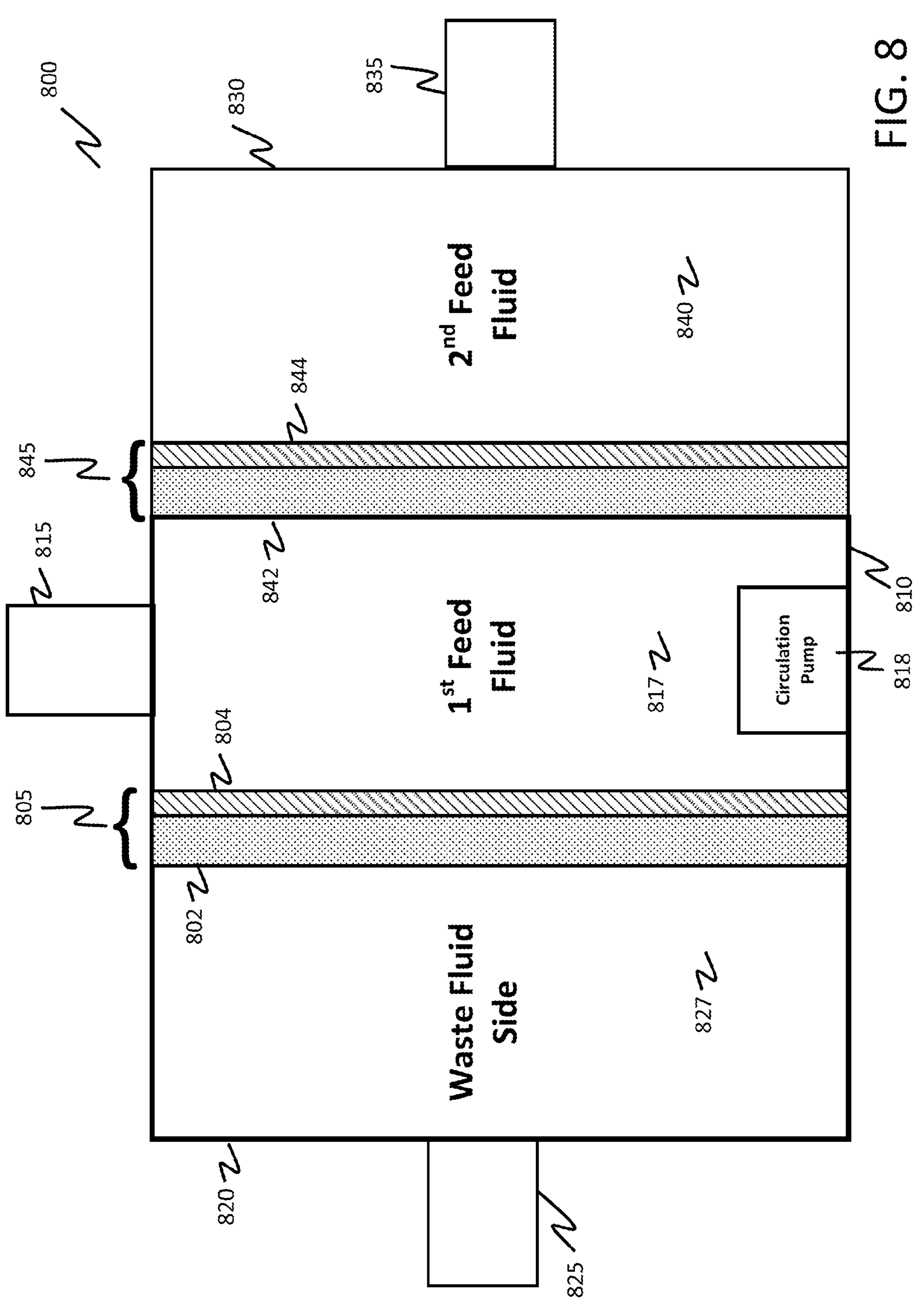
FIG. 8 shows a cutaway schematic diagram of a first membrane separating a first and second fluid reservoir for filtering one or more compounds from a fluid as well as a second membrane separating a third fluid reservoir from the first fluid reservoir in accordance with some implementations.

FIG. 8 shows one implementation of a cutaway of a filtering system 800. The filtering system 800 is similar to the filtering system described in connection with FIG. 4A with a few changes, discussed herein below. The filtering system includes a membrane 805. In some implementations, the membrane 805 may include the GOM as previously discussed or another suitable membrane. In some implementations, the membrane 805 includes a substrate layer 802 and a GO layer 804. In some implementations, the filtering system may include a feed vessel 810. The feed vessel may include one or more inlets 815. It should be appreciated that the inlets can also serve as outlets. The feed vessel 810 may receive the training fluid discussed above through the one or more inlets 815. The feed vessel may also receive the second fluid 817 (e.g., the $1^{st}$ feed fluid) discussed above through the one or more inlets 815. In some implementations, the filtering system may include a circulation pump 818. In some implementations, the circulation pump is included within the feed vessel 810. In some implementations, the circulation pump in located outside of the feed vessel 810. In some implementations, the circulation pump may be used to circulate fluids added to the feed vessel 810.

In some implementations, the filtering system 800 also includes a waste vessel 820. The waste vessel 820 may include one or more outlets 825. It should be appreciated that the outlets 825 can also serve as inlets. The waste vessel 820 may receive the training fluid passing through the membrane 805. The waste vessel 820 may also receive the third fluid discussed above through the outlet 825. As noted in connection with FIG. 2, a third fluid can be refreshed within the waste vessel 820 in some implementations. In some implementations, this may carry away the at least one compound that is added to the third fluid during the osmotic process, which can keep the at least one compound in the third fluid out of balance with respect to the at least one compound contained in the second fluid that flows through the membrane 805. In some implementations, the third fluid can be refreshed within the waste vessel 820 periodically. While not shown, it should be appreciated that the waste vessel 820 may similarly include a circulation pump inside or outside of the waste vessel 820, as described above with respect to the feed vessel 810.

In some implementations, the membrane 805 creates a sealing interface between the feed vessel 810 and the waste vessel 820. In some implementations, the sealing interface between the two vessels does not allow fluid to pass between the feed vessel 810 and the waste vessel 820 except through the membrane 805. It should be appreciated that while the membrane 805 appears to span the width of the interface between the feed vessel 810 and the waste vessel 820, the membrane 805 can be smaller than the width of the interface between the feed vessel 810 and the waste vessel 820.

In some implementations, the filtering system 800 may include a second fluid vessel 830. The flavor vessel may include one or more inlets 835. The second fluid second fluid 830 may receive a 2$^{nd}$ feed fluid 840 (e.g., a flavor fluid). It should be appreciated that the inlets can also serve as outlets. The filtering system may also include a membrane 845. In some implementations, the membrane 845 may include the GOM as previously discussed or another suitable membrane. In some implementations, the membrane 845 includes a substrate layer 842 and a GO layer 844. In some implementations, the membrane 845 creates a sealing interface between the feed vessel 810 and the second fluid 830. In some implementations, the sealing interface between the two vessels does not allow fluid to pass between the feed vessel 810 and the second fluid 830 except through the membrane 845. It should be appreciated that while the membrane 845 appears to span the width of the interface between the feed vessel 810 and the second fluid 830, the membrane 845 can be smaller than the width of the interface between the feed vessel 810 and the second fluid 830. The second fluid 830 may receive one or more fourth fluids through the one or more inlets 835 in some implementations. The membrane 845 may be trained on another training fluid that contains one or more compounds found in the fourth fluid. Thus, the membrane 845 can be used to impart one or more additional flavors from a 2$^{nd}$ feed fluid 840 into the first feed fluid 817.

For purposes of reference, the filtering system 800 can be used as discussed in connection with the filtering process described in FIG. 2.

It should therefore be appreciated that the various methods and apparatuses discussed herein, when applied to alcoholic beverages, enables the production of low alcohol or substantially non-alcoholic beverages that taste like their traditional alcoholic beverage counterparts. In some implementations, the methods and apparatuses discussed herein enable ethanol or ethel alcohol to be substantially removed from an alcoholic beverage while substantially preventing other compounds from being removed from the alcoholic beverage. The resulting beverage can either contain low alcohol or substantially no alcohol, while retaining many or most of the compounds that give the original alcoholic beverage its signature taste. For example, if the methods and apparatuses discussed herein are applied to a brewed alcoholic beverage (e.g., a stout beer) to produce an altered stout beer, the altered stout beer continues to taste like the stout beer, while the altered stout beer has low or substantially no alcohol. As another example, if the methods and apparatuses discussed herein are applied to a distilled spirit like gin, the altered gin continues to taste like the original gin, while the altered gin has low or substantially no alcohol. In other words, in some implementations, the novel methods and apparatuses discussed herein can produce a low alcohol or non-alcoholic beverage that tastes the same or very similar to their alcoholic counterparts and can mimic or substitute for traditional alcoholic beverages. In some implementations, the methods and apparatuses discussed herein can be applied to other beverages or human consumable items. For example, if a lactating mother consumed alcohol, the milk the mother produces may contain alcohol. Previously, such a lactating mother would be forced to throw out any milk contaminated with alcohol. When the mother's milk is applied to the various methods and apparatuses noted above, the mother milk can have the alcohol contamination removed from the milk and enable the milk to be provided to the mother's nursing child. As another example, the methods and apparatuses discussed herein can be applied to tinctures (e.g., a solution that has ethanol as its solvent). In some implementations, a tincture can be an extract of plant or animal material dissolved in ethanol. Solvent concentrations of ethanol in the tinctures can typically range between 25-60%. In some implementations, the solvent concentrations of ethanol can run as high as 90%. The various methods and apparatuses discussed herein can be applied to such tinctures to remove the ethanol, while substantially retaining the extract without the alcohol. As yet another example, some consumable food products like flavoring (e.g., vanilla flavoring) or *cannabis* extracts are stored in an alcohol based solution. The various methods and apparatuses discussed herein can be applied to such consumable products to remove the alcohol, while retaining the consumable item. Removing alcohol from such consumable items is highly desirable for people that must avoid alcohol (e.g., people that are allergic to alcohol, people with alcohol addiction problems, etc.). It should also be appreciated that the above methods and apparatuses can be applied to other suitable fluids in the food and beverage industry.

The present disclosure is not to be limited in terms of the particular implementations described in this application, which are intended as illustrations of various aspects. Moreover, the various disclosed implementations can be interchangeably used with each other, unless otherwise noted. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

A number of implementations have been described. Various modifications may be made without departing from the spirit and scope of the invention. For example, various forms of the flows shown above may be used, with steps re-ordered, added, or removed. Accordingly, other implementations are within the scope of the following claims.

We claim:

1. A method of separating an organic compound from a fluid, the method comprising:

training a graphene oxide membrane with a first fluid comprising ethanol in a range of 30% to 100% on a first side of the graphene oxide membrane;

moving a second fluid comprising an alcoholic beverage across the first side of the graphene oxide membrane for a predetermined quantity of time at a first predetermined rate, wherein the second fluid is in contact with the first side of the graphene oxide membrane and wherein the second fluid comprises ethanol;

moving a third fluid comprising water across a second side of the graphene oxide membrane for the predetermined quantity of time at a second predetermined rate;

transferring at least a portion of the ethanol from the second fluid to the third fluid through the graphene oxide membrane using forward osmosis; and recovering the second fluid with the portion of the ethanol removed from the second fluid.

2. The method of claim 1, wherein transferring the ethanol from the second fluid to the third fluid through the graphene oxide membrane using forward osmosis preferentially permits the ethanol to transfer to the third fluid while substantially excluding water from transferring to the third fluid through the membrane.

3. The method of claim 1, wherein training the graphene oxide membrane further comprises:

atomizing the first fluid; and applying a layer of the atomized first fluid on the first side of the graphene oxide membrane.

4. The method of claim 3, wherein one or more additional layers of the atomized first fluid are periodically reapplied one or more times to the first side of the graphene oxide membrane until the first fluid appears on the second side of the membrane.

5. The method of claim 1, wherein training the graphene oxide membrane further comprises:

misting at least one layer of the first fluid on the first side of the membrane.

6. The method of claim 1, wherein a pressure is applied to the second fluid on the first side of the graphene oxide membrane, wherein the pressure ranges from 0.75 bars or less.

7. The method of claim 1, wherein a pressure is applied to the second fluid on the first side of the graphene oxide membrane with a gas.

8. The method of claim 7, wherein the gas is substantially an inert gas.

9. The method of claim 1, wherein moving the second fluid across the first side of the graphene oxide membrane for the predetermined quantity of time at the first predetermined rate further comprises moving the second fluid tangentially across the first side of the graphene oxide membrane.

10. The method of claim 1, wherein moving the third fluid across the second side of the graphene oxide membrane for the predetermined quantity of time at the second predetermined rate further comprises moving the third fluid tangentially across the second side of the graphene oxide membrane.

11. The method of claim 1, wherein the second fluid is moved across the first side of the graphene oxide membrane in a first direction and the third fluid is moved across the second side of the graphene oxide membrane in a second direction, wherein the first direction and the second direction are a same direction.

12. The method of claim 1, wherein the second fluid is moved across the first side of the graphene oxide membrane in a first direction and the third fluid is moved across the second side of the graphene oxide membrane in a second direction, wherein the first direction and the second direction are different directions.

13. The method of claim 12, wherein the second predetermined rate is in a range of 1 to 5 times faster than the first predetermined rate.

14. A method of separating an organic compound from a fluid, the method comprising:

saturating a graphene oxide membrane with a first fluid comprising ethanol on a first side of the membrane;

applying a second fluid to the first side of the graphene oxide membrane, wherein the second fluid is in contact with the first side of the membrane and wherein the second fluid comprises a plurality of compounds and at least one compound comprises ethanol;

applying a third fluid comprising water to a second side of the membrane;

moving the second fluid across the first side of the membrane for a predetermined quantity of time at a first predetermined rate;

moving the third fluid across the second side of the membrane for the predetermined quantity of time at a second predetermined rate;

transferring at least a portion of the ethanol from the second fluid to the third fluid through the membrane using forward osmosis; and recovering the second fluid with the portion of the ethanol removed from the second fluid.

* * * * *